(12) United States Patent
Park et al.

(10) Patent No.: US 10,394,201 B2
(45) Date of Patent: Aug. 27, 2019

(54) METHOD AND APPARATUS FOR CONTROLLING DEVICE OF ONE REGION AMONG A PLURALITY OF REGIONS

(71) Applicant: Samsung Electronics Co., Ltd., Suwon-si, Gyeonggi-do (KR)

(72) Inventors: Gyungmin Park, Suwon-si (KR); Hogun Lim, Seoul (KR); Hyoyong Jeong, Yongin-si (KR); Hyunsuk Min, Suwon-si (KR); Sangsun Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 213 days.

(21) Appl. No.: 15/196,840

(22) Filed: Jun. 29, 2016

(65) Prior Publication Data

US 2016/0378084 A1 Dec. 29, 2016

(30) Foreign Application Priority Data

Jun. 29, 2015 (KR) .......................... 10-2015-0092544

(51) Int. Cl.
| | | |
|---|---|---|
| G05B 15/02 | (2006.01) | |
| H04W 4/70 | (2018.01) | |
| H04W 4/38 | (2018.01) | |
| H04W 4/50 | (2018.01) | |
| H04L 29/08 | (2006.01) | |
| H04W 4/04 | (2009.01) | |
| H04L 12/24 | (2006.01) | |
| H04L 12/28 | (2006.01) | |

(52) U.S. Cl.
CPC ............ *G05B 15/02* (2013.01); *H04L 12/283* (2013.01); *H04L 41/0806* (2013.01); *H04L 67/125* (2013.01); *H04W 4/043* (2013.01); *H04W 4/38* (2018.02); *H04W 4/50* (2018.02); *H04W 4/70* (2018.02)

(58) Field of Classification Search
CPC ........................................ G05B 15/02
See application file for complete search history.

(56) References Cited

U.S. PATENT DOCUMENTS

| | | | | |
|---|---|---|---|---|
| 9,431,980 | B2* | 8/2016 | Popova | .................... H04S 7/303 |
| 9,622,570 | B1* | 4/2017 | Holdredge | ............ A47B 23/043 |
| 2008/0112571 | A1* | 5/2008 | Bradicich | ................ G06F 1/206 |
| | | | | 381/73.1 |
| 2010/0127866 | A1* | 5/2010 | Klein | ..................... A61B 5/1113 |
| | | | | 340/541 |

(Continued)

FOREIGN PATENT DOCUMENTS

KR 10-2014-0094049 A 7/2014

*Primary Examiner* — Vincent H Tran
(74) *Attorney, Agent, or Firm* — Jefferson IP Law, LLP

(57) ABSTRACT

A method of a server for controlling, a device of one region among a plurality of regions is provided. The method includes acquiring situation information of a first region among the plurality of regions, determining a state of a user in the first region based on the acquired situation information of the first region, determining a device set-up value of a second region adjacent to the first region among the plurality of regions based on the determined state of the user in the first region, and transmitting the determined device set-up value of the second region to a device of the second region or a gateway connected to the device of the second region.

18 Claims, 16 Drawing Sheets

(56) References Cited

U.S. PATENT DOCUMENTS

| | | | |
|---|---|---|---|
| 2013/0024018 A1* | 1/2013 | Chang | G08C 17/02 |
| | | | 700/94 |
| 2013/0090770 A1 | 4/2013 | Lee et al. | |
| 2013/0166076 A1* | 6/2013 | Karr | G05B 15/02 |
| | | | 700/280 |
| 2013/0170647 A1* | 7/2013 | Reilly | H04R 27/00 |
| | | | 381/17 |
| 2013/0183944 A1* | 7/2013 | Mozer | H04L 12/282 |
| | | | 455/414.1 |
| 2014/0037107 A1* | 2/2014 | Marino, Jr. | H03G 3/10 |
| | | | 381/107 |
| 2014/0167931 A1 | 6/2014 | Lee et al. | |
| 2014/0207721 A1 | 7/2014 | Filson et al. | |
| 2015/0102024 A1 | 4/2015 | Barfuss et al. | |
| 2016/0062329 A1* | 3/2016 | Fujise | H04N 21/4532 |
| | | | 700/83 |
| 2016/0093196 A1* | 3/2016 | Shinar | A61B 5/6892 |
| | | | 340/565 |
| 2016/0149547 A1* | 5/2016 | Rider | H03G 3/04 |
| | | | 381/57 |
| 2016/0223998 A1* | 8/2016 | Songkakul | G05B 15/02 |
| 2016/0301373 A1* | 10/2016 | Herman | H03G 3/3005 |

* cited by examiner

METHOD AND APPARATUS FOR CONTROLLING DEVICE OF ONE REGION AMONG A PLURALITY OF REGIONS

CROSS-REFERENCE TO RELATED APPLICATION(S)

This application claims the benefit under 35 U.S.C. § 119(a) of a Korean patent application filed on Jun. 29, 2015 in the Korean Intellectual Property Office and assigned Serial number 10-2015-0092544, the entire disclosure of which is hereby incorporated by reference.

TECHNICAL FIELD

The present disclosure relates to a method for controlling a device of one region among a plurality of regions. More particularly, the present disclosure relates to a method and an apparatus for controlling devices of other regions among a plurality of regions on the basis of information acquired in one region among the plurality of regions.

BACKGROUND

The Internet is evolved to an internet of things (IoT) network having information between distributed components like things transmitted and received therethrough and processing the information, in a human-centered connection network through which a human being generates and consumes information. The internet of everything (IoE) technology in which a big data processing technology, or the like by a connection with a cloud server, or the like is combined with the IoT technology has also emerged. To implement the IoT, technology elements, such as a sensing technology, wired and wireless communication and network infrastructure, a service interface technology, and a security technology, have been required. Recently, technologies such as a sensor network, machine to machine (M2M), and machine type communication (MTC) for connecting between things has been researched.

In the IoT environment, an intelligent internet technology (IT) service that creates a new value in human life by collecting and analyzing data generated in the connected things may be provided. The IoT may be applied to fields, such as a smart home, a smart building, a smart city, a smart car or a connected car, a smart grid, a health care, smart appliances, and an advanced healthcare service by fusing and combining the existing IT with various industries.

Meanwhile, the IoT technology may also be used for buildings including a plurality of regions. An example of buildings including the plurality of regions may include a building including a plurality of offices, a hotel including a plurality of rooms, and an apartment house (for example, apartment, villa, or the like) consisting of a multi-household house.

In this case, people residing in the plurality of regions, respectively, may feel uncomfortable. For example, people residing at different floors may suffer from a floor noise problem. In particular, a floor impact sound generated by impact directly applied to a floor surface of building has characteristics in that it is easily transferred to neighboring floors. As a result, a fight between people of neighboring floors may be expanded to a social problem.

When a plurality of regions is close to each other, noise generated in one region among the plurality of regions may be transferred to other neighboring regions. For example, when a user in one region watches television (TV), a sound of the TV may be transferred to other regions. In this case, the user in one region may want to watch TV without disturbing users in other regions. As another example, when the user in one region operates a cleaner, an operating sound of the cleaner may be transferred to other regions. In this case, the user in one region may want to operate a cleaner without disturbing users in other regions. As another example, when a housekeeper cleaning a hotel wants to clean rooms, the housekeeper may want to clean the guest rooms without disturbing guests of other rooms.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of enabling a server to control a device of one region on the basis of information acquired in regions adjacent to one region among a plurality of regions.

Another aspect of the present disclosure is to provide a method of enabling a user in one region to conveniently control a device while considering peoples in neighboring regions by providing notice information to users in regions adjacent to one region not to disturb the users.

In accordance with an aspect of the present disclosure, a method of a server for controlling a device of one region among a plurality of regions is provided. The method includes acquiring situation information of a first region among the plurality of regions, determining a state of a user in the first region on the basis of the acquired situation information of the first region, determining a device set-up value of a second region adjacent to the first region among the plurality of regions on the basis of the determined state of the user in the first region, and transmitting the determined device set-up value of the second region to a device of the second region or a gateway connected to the device of the second region.

The device set-up value of the second region may correspond to a state in which the user in the first region is present or a state in which the user in the first region is absent.

The device set-up value of the second region may include a maximum volume level or a maximum operation level that the device of the second region outputs.

The method may further include determining a message associated with a state of a user in the first region and transmitting the determined message to the device of the second region or the gateway connected to the device of the second region.

The acquiring of the situation information of the first region among the plurality of regions may include acquiring the situation information of the first region according to a request of the user in the second region or a request of the gateway of the second region.

The determining of a state of a user in the first region on the basis of the acquired situation information of the first region may include determining of the state of the user of the first region on the basis of the situation information of the first region and characteristic information associated with a use behavior of the first region.

The device of the second region may output a sound or vibration.

The situation information of the first region may include information acquired from a sensor located in the first region.

The sensor may include at least one of a motion detection sensor, a door open and close detection sensor, a temperature sensor, and an illumination sensor.

The present disclosure relates to a technology for a sensor network, machine to machine (M2M), machine type communication (MTC), and internet of things (IoT). The present disclosure may be used for an intelligent service (smart home, smart building, smart city, smart car or connected car, health care, digital education, retail business, security and safety related service, or the like) based on the technology.

In accordance with another aspect of the present disclosure, a server for controlling a device of one region among a plurality of regions is provided. The server includes a transceiver transmitting and receiving required information and a controller acquiring situation information of a first region among the plurality of regions through the transceiver, determining a state of a user in the first region on the basis of the acquired situation information of the first region, determining a device set-up value of a second region adjacent to the first region among the plurality of regions on the basis of the determined state of the user in the first region, and transmitting the determined device set-up value of the second region to a device of the second region or a gateway connected to the device of the second region through the transceiver.

The device set-up value of the second region may correspond to a state in which the user in the first region is present or a state in which the user in the first region is absent.

The device set-up value of the second region may include a maximum volume level or a maximum operation level that the device of the second region outputs.

The controller may determine a message associated with a state of a user in the first region and transmit the determined message to the device of the second region or the gateway connected to the device of the second region.

When the situation information of the first region among the plurality of regions is acquired, the controller may acquire the situation information of the first region according to a request of the user in the second region or a request of the gateway of the second region.

When the state of the user in the first region is determined on the basis of the acquired situation information of the first region, the controller may include determining a state of a user of the first region on the basis of the situation information of the first region and characteristic information associated with a use behavior of the first region.

The device of the second region may output a sound or vibration.

The situation information of the first region may include information acquired from a sensor located in the first region.

The sensor may include at least one of a motion detection sensor, a door open and close detection sensor, a temperature sensor, and an illumination sensor.

In accordance with another aspect of the present disclosure, a server for controlling a device of one region among a plurality of regions is provided. The server includes a transceiver transmitting and receiving required information and a controller acquiring situation information of a first region among the plurality of regions through the transceiver, determining a device set-up value of a second region adjacent to the first region among the plurality of regions on the basis of the acquired situation information of the first region, and transmitting the determined device set-up value of the second region to the device of the second region or a gateway connected to the device of the second region through the transceiver.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
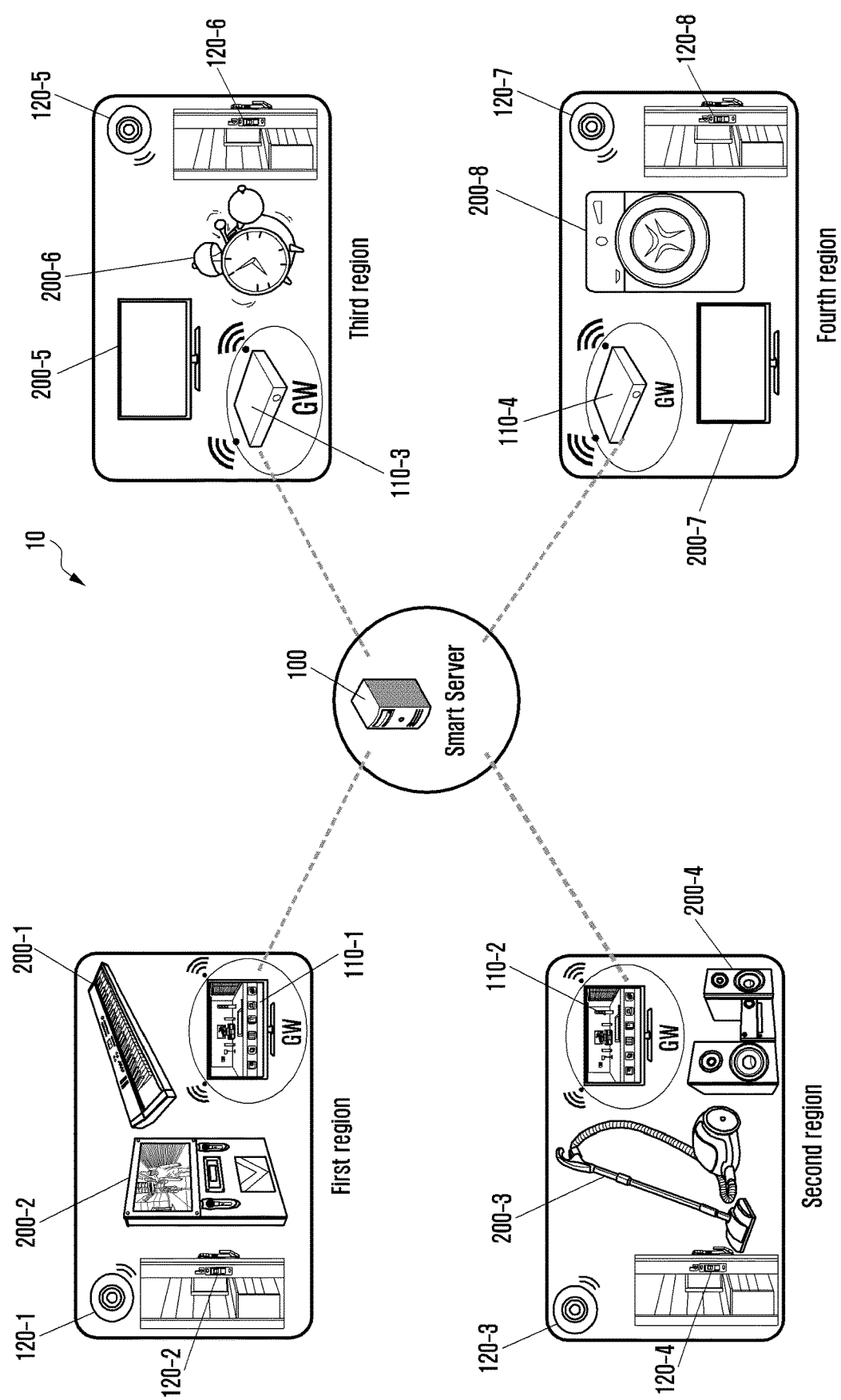
FIG. 1 is a view showing the whole configuration of a system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Terms used in embodiments of the present disclosure are selected as general terminologies currently widely used in consideration of the configuration and functions of the present disclosure, but may be different depending on intention of those skilled in the art, a precedent, appearance of new technologies, and the like. Further, in specific cases, terms arbitrarily selected by an applicant are present. In this case, the detailed meaning of the terms will be described in the description of the present disclosure. Therefore, terms used in the present disclosure are defined based on a meaning of the terms and contents described in the present disclosure, not simply based on names of the terms.

In the embodiment of the present disclosure, it may be understood that each block of flow charts and combinations of flow charts may be performed by computer program instructions. Since these computer program instructions may be installed in processors of a general computer, a special computer, or other programmable data processing apparatuses, these computer program instructions executed through the process of the computer or the other programmable data processing apparatuses create means performing functions described in block(s) of the flow chart. Since these computer program instructions may also be stored in a computer usable memory or a computer readable memory or other programmable data processing apparatuses that may direct a computer or other programmable data processing apparatuses in order to implement functions in a specific scheme, the computer program instructions stored in the computer usable memory or the computer readable memory may also produce manufacturing articles including instruction means performing the functions described in the block(s) of the flow chart. Since the computer program instructions may also be installed in a computer or other programmable data processing apparatuses, they perform a series of operations on the computer or the other programmable data processing apparatuses to create processes executed by the computer, such that the computer program instructions executing the computer or the other programmable data processing apparatuses may also provide operations for performing the functions described in the block(s) of the flow chart. In addition, each block may indicate some of modules, segments, or codes including one or more executable instructions for executing a specified logical function(s). Further, it is to be noted that functions mentioned in the blocks occur regardless of a sequence in some alternative embodiments. For example, two blocks that are shown in succession may be simultaneously performed in fact or may be sometimes performed in a reverse sequence depending on corresponding functions.

In the embodiment of the present disclosure, terms 'first', 'second', and the like, may be used to describe various components, but the components are not to be construed as being limited by the terms. The terms are used to distinguish one component from another component.

It will be further understood that the terms "comprises" or "have" used in this specification, specify the presence of stated features, operations, components, parts mentioned in this specification, or a combination thereof, but do not preclude the presence or addition of one or more other features, numerals, operations, components, parts, or a combination thereof.

In the various embodiments of the present disclosure, a 'module' or a 'unit' performs at least one function or operation and may be implemented by hardware or software or a combination of the hardware and the software. Further, a plurality of 'modules' or a plurality of 'units' are integrated into at least one module except for the 'module' or 'unit' which needs to be implemented by specific hardware and thus may be implemented by at least one processor.

In the embodiment of the present disclosure, a case in which any one part is connected with the other part includes a case in which the parts are directly connected with each other and a case in which the parts are connected with each other with other elements interposed therebetween. In addition, unless explicitly described to the contrary, "comprising" any components will be understood to imply the inclusion of other elements rather than the exclusion of any other elements.

Further, in the embodiment of the present disclosure, a user input may include at least one of a touch input, a bending input, a speech input, a button input, a motion input, and a multimodal input, but is not limited thereto.

Further, in the embodiment of the present disclosure, a user interaction (UI) element means an element which may implement interaction with a user to perform visual, audible, tactile, olfactory feedbacks, or the like by the user input.

FIG. 1 is a view showing the whole configuration of a system according to an embodiment of the present disclosure.

Referring to FIG. 1, a system 10 may include a server 100 and a plurality of regions 1, 2, 3, and 4. The plurality of regions 1 to 4 may be divided into physical materials (for example, wall, compartment that may be temporarily installed/removed, or the like). Further, when the system 10 is constructed in a hotel, the plurality of regions 1 to 4 may be a plurality of rooms and users using the plurality of rooms 1 to 4 may be guests. Further, when the server 100 is constructed in a building, regions of the building may be offices and users using the offices of the building may be office workers. Further, when the server 100 is constructed in a hospital, regions of the hospital may be wards and users using the wards may be patients or nurses.

The plurality of regions 1 to 4 may be adjacent to each other. For example, the plurality of regions 1 to 4 may be adjacent to each other while contacting walls or floors. Alternatively, even though the plurality of regions 1 to 4 are spaced apart from each other by a predetermined distance, it may be considered that the plurality of regions 1 to 4 are adjacent to each other. For example, other regions located within a predetermined radius (for example, radius of 150 m) with respect to one region among the plurality of regions 1 to 4 may be considered to be regions adjacent to one region.

The plurality of regions 1 to 4 may include gateways 110-1, 110-2, 110-3, and 110-4, devices 200-1, 200-2, 200-3, 200-4, 200-5, 200-6, 200-7, and 200-8, and sensors 120-1, 120-2, 120-3, 120-4, 120-5, 120-6, 120-7, and 120-8.

The devices 200-1 to 200-8 of the plurality of regions 1 to 4 may be devices having various purposes for each user convenience using the plurality of regions 1 to 4. For example, the devices 200-1 to 200-8 in the home may be devices having various purposes such as television (TV), a cleaner, audio, an alarm watch, an electronic piano, karaoke room equipment, a washing machine, a thermostat, an air conditioner, a heater, a refrigerator, a lighting installation, a cooker, a dish washer, and a robot cleaner. In particular, the present disclosure will mainly describe devices outputting a sound or vibration as the devices 200-1 to 200-8 of the plurality of regions 1 to 3. That is, the devices 200-1 to 200-8 of the plurality of regions of the present disclosure may be mainly devices that may directly or indirectly disturb users in adjacent regions when they are operated.

The sensors 120-1 to 120-8 of the plurality of regions 1 to 4 may acquire situation information of the plurality of regions 1 to 4, respectively. The sensors 120-1 to 120-8 of the plurality of regions 1 to 4 may include, for example, sensors having various purposes, such as a motion detection sensor, a door open and close detection sensor, a temperature sensor, an illumination detection sensor, a sound detection sensor, a vibration detection sensor, and a fragrance detection sensor. In particular, the present disclosure will mainly describe the motion detection sensor detecting a user motion moving within the plurality of regions 1 to 4 as the sensors 120-1 to 120-8 of the plurality of regions 1 to 4.

The gateways 110-1 to 110-4 may be connected to the devices 200-1 to 200-8 in a wired communication manner or a wireless communication manner to transmit and receive information required for a control. Further, the gateways 110-1 to 110-4 may be connected to the server 100 in a wired communication manner or a wireless communication manner to transmit and receive information required for a control of the devices 200-1 to 200-8.

For example, the gateways 110-1 to 110-4 may acquire sensor information from the sensors 120-1 to 120-8 and transmit the acquired sensor information to the server 100. For example, the gateways 110-1 to 110-4 may acquire sensor information from the sensors 200-1 to 200-8 and transmit the acquired sensor information to the server 100.

Meanwhile, the devices of the plurality of regions 1 to 4 may replace a function of the gateway. That is, the device in which the function of the gateway is built-in may also replace the function of the gateway. For example, when the device that may perform the function of the gateway is built in TV, the gateways 110-1 and 110-2 may perform the function of the gateway in addition to a basic function of TV.

The server 100 may receive and store information required to operate the system 10 from each device and may transmit the information to each device. For example, the server 100 may be connected to the gateways 110-1 to 110-4 of each region in a wired communication manner or a wireless communication manner to transmit and receive the required information. Alternatively, the server 100 may be also connected to the devices 200-1 to 200-8 of each region in a wired communication manner or a wireless communication manner to transmit and receive the required information. Alternatively, the server 100 may be also connected to the sensors 120-1 to 120-8 of each region in a wired communication manner or a wireless communication manner to directly transmit and receive the required information.

In detail, the server 100 may acquire situation information of a first region 1 from the gateway 110-1 of the first region 1 among the plurality of regions. Further, a state of a user in the first region 1 may be determined on the basis of the acquired situation information of the first region 1.

The following Table 1 shows examples in which the state of the user within a specific region is determined on the basis of the situation information.

TABLE 1

| State of user | Situation information |
|---|---|
| Absence | Door lock locking detection, lamp off detection, TV off detection, motion information detection |
| Presence | Door lock open detection, lamp on detection, motion information detection |
| Movie appreciation | Media player playing detection, speaker on detection |
| Bedtime | Evening, lamp off detection, TV off detection |
| Waking up | Alarm on detection, lamp on detection, audio-visual (AV) on detection |
| Cleaning | Window open detection, cleaner on detection, noise detection |

Further, the server 100 may determine a device set-up value of the second region 2 adjacent to the first region 1 on the basis of the state of the user determined on the situation information. Further, the determined device set-up value of the second region 2 may be transmitted to the device of the second region 2 or the gateway 110-2 connected to the device of the second region 2.

The system may be used at a location divided into the plurality of regions and providing various services. For example, an example of the location may include a building including a plurality of offices, a hotel including a plurality of rooms, an apartment house (for example, apartment, villa, or the like) including a multi-household house, a hospital including wards, or the like.

In particular, to help understanding, the case in which the various embodiments of the present disclosure are used in a hotel will be mainly described.

For example, the various embodiments of the present disclosure may be used to control a hotel management system (HMS) of a hotel. The HMS is a system for managing a hotel on the whole and may include a system for managing guests and a system for providing an optimal room state such as temperature control/air cleaning. Energy consumption of a hole may be significantly saved by effectively controlling the HMS, thereby increasing a return of a hotel and satisfaction of guests. Alternatively, the various embodiments of the present disclosure may be used for a building management service (BMS) for managing a building on the whole or a noise management service (NMS) for a building.

Further, for convenience of explanation, the case in which one of the devices 200-1 to 200-8 will be defined as the device 200 of one region will be described below. In the present disclosure, a representative example of the device 200 of one region may be TV, audio, or the like that belong to a kind of sound output devices. Further, the case in which one of the gateways 110-1 to 110-4 is defined as the gateway 110 of one region will be described. Further, for convenience of explanation, the case in which one of the sensors 120-1 to 120-4 will be defined as the device 120 of one region will be described below.

In this case, the gateway 110 of the first region 1 may transmit the situation information received from the sensor 120 of the first region 1 to the server 100. The server 100 may transmit the set-up value determined on the basis of the received situation information to the gateway 110 of the second region 2 or the device 200 of the second region 2.

Figure 2:
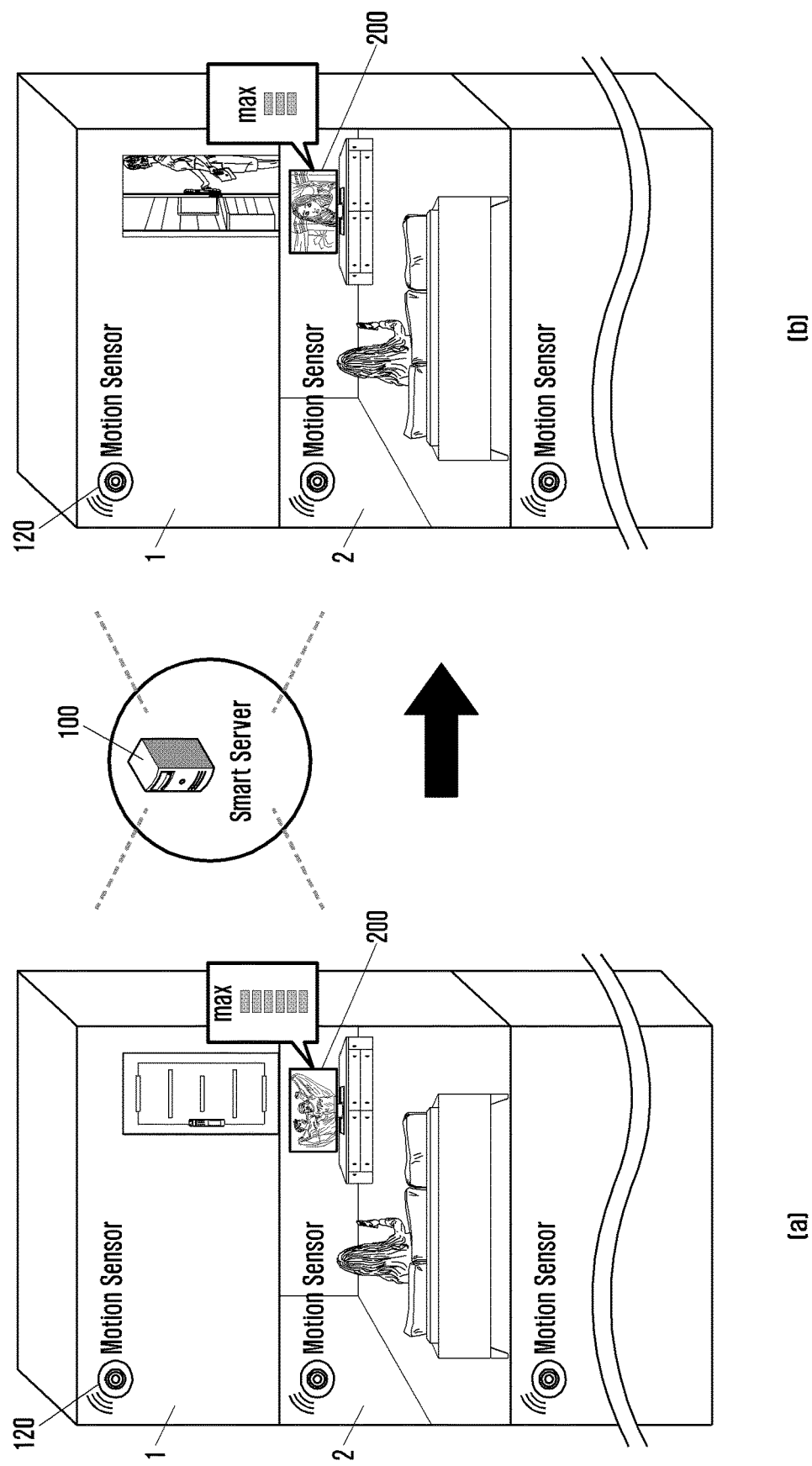
FIG. 2 illustrates diagrams [a] and [b] of a situation in which a server controls a device of one region according to various embodiments of the present disclosure.

FIG. 2 illustrates diagrams [a] and [b] of a situation in which a server controls a device according to an embodiment of the present disclosure.

Referring to diagram [a] of FIG. 2, the server 100 may acquire the situation information of the first region 1 under the situation in which the user in the first region 1 goes out. The situation information may be motion information of the user in the first region 1 that is acquired by the sensor 120 of the first region 1. The situation information may be acquired at a predetermined period (for example, 1 minute to 10 minutes) and may also be acquired when an event like the case in which the user in the second region 2 controls the device 200 of the second region 2 is generated. Further, the server may also directly acquire the situation information from the sensor 120 of the first region 1 and may also acquire the situation information through the gateway (not illustrated) of the first region 1.

The server 100 may determine the state of the user in the first region 1 on the basis of the acquired situation information of the first region 1. For example, if the motion information is not detected in the first region 1 for a predetermined time, the server 100 may determine that the user in the first region 1 is absent in the first region 1.

If it is determined that the user in the first region 1 is absent, the server 100 may determine the device set-up value of the device 200 of the second region 2 corresponding to the state in which the user is absent.

For example, when the device 200 of the second region 2 is TV, the server 100 may determine a maximum volume level of the TV 200 of the second region 2. In this case, if it is assumed that a range of a volume level that the TV 200 may output ranges from 0 to 40 levels, the maximum volume level of the TV 200 may be set to be level 40. That is, since the user in the first region 1 adjacent to the second region 2 is absent, the server 100 may set the volume level that the device 200 of the second region 2 may output to be maximum.

The server 100 may set the determined device set-up value to the gateway of the second region 2. Alternatively, the server 100 may directly transmit the determined device set-up value of the device 200 of the second region 2 to the device 200 of the second region 2. In this case, the device 200 of the second region 2 may also serve as the gateway. The device 200 of FIG. 2 diagram is assumed to be a device that may serve as the gateway.

Meanwhile, if the determined device set-up value is equal to a volume level that the device 200 of the second region 2 may currently output, the server 100 may transmit information indicating that the control of the volume level is unnecessary to the device 200 of the second region 2.

The device 200 of the second region 2 may set the maximum volume level depending on the received device set-up value. For example, the device 200 of the second region 2 may set the maximum volume level that may be output to be 40 levels depending on the received device set-up value.

Alternatively, when the volume level that is currently being output is lower than the maximum volume level the device set depending on the device set-up value, the device 200 of the second region 2 may provide a user of notice information that he/she may raise a volume. For example, the device 200 of the second region 2 may display notice information like 'it may not know whether neighboring houses are empty, but further turn up a volume" on the display unit.

Meanwhile, FIG. 2 diagram [b] illustrates a situation in which the user in a first region 1 comes home.

Referring to diagram [b] of FIG. 2, the server 100 may again acquire the situation information of the first region 1. The situation information may include, for example, the motion information of the user in the first region acquired by the sensor 120. In this case, the situation information may be acquired at a predetermined period and may also be acquired when the event like the case in which the user in the second region 2 controls the device 200 of the second region 2 is generated. Alternatively, when the sensor 120 is the door open and close detection sensor, the situation information may also be acquired when a door open detection event is generated.

The server 100 may determine the state of the user in the first region 1 on the basis of the acquired situation information of the first region 1. For example, when the motion information of the user in the first region 1 is detected, the server 100 may be determined that the user in the first region 1 is present.

If it is determined that the user in the first region 1 is present, the server 100 may determine the device set-up value of the device 200 of the second region 2 corresponding to the state in which the user is present.

For example, when the device 200 of the second region 2 is TV, the server 100 may determine the maximum volume level of the TV 200 of the second region 2. In this case, if it is assumed that the range of the volume level that the TV 200 may output ranges from 0 to 40 levels, the maximum volume level of the TV 200 may be set to be level 30. That is, the server 100 may limit the maximum volume level that the device 200 of the second region 2 may output without disturbing the user in the first region 1 adjacent to the second region 2.

The server 100 may set the determined device set-up value to the gateway of the second region 2. Alternatively, the server 100 may directly transmit the determined device set-up value of the device 200 of the second region 2 to the device 200 of the second region 2. In this case, the device 200 of the second region 2 may also serve as the gateway. The device 220 of FIG. 2 diagram [b] is assumed to be a device that may serve as the gateway.

The device 200 of the second region 2 may set a maximum output level depending on the received device set-up value. For example, the device 200 of the second region 2 may set the maximum volume level that may be output to be 30 levels.

Meanwhile, the device 200 of the second region 2 may receive a user input. If it is determined that a volume manipulation value by the user input is equal to or more than a maximum output value, the device 200 of the second region 2 may provide notice information indicating that the output of the device 200 is limited. For example, if it is determined that the user manipulates the maximum volume level to be equal to or more than 30 levels, the device 200 of the second region 2 may display notice information like 'there is a possibility of disturbing neighboring houses and therefore further turn down a volume', or the like on the display unit.

As such, as the volume level that may be manipulated by the user in the second region 2 is limited, the user in the second region 2 may conveniently control the device 200 while considering the user in the first region 1 adjacent to the second region 2.

Figure 3:
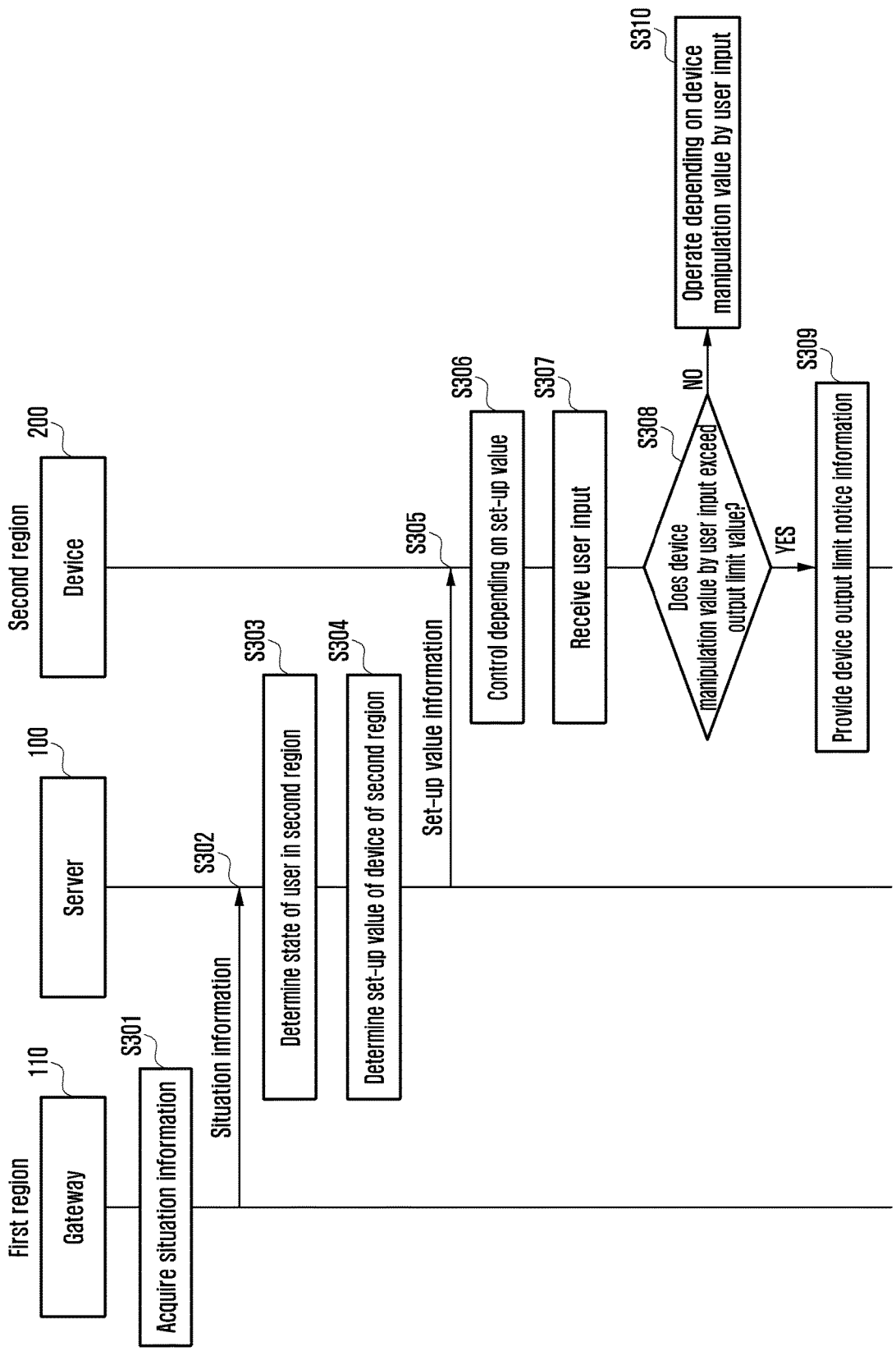
FIGS. 3, 4, and 5 are diagrams illustrating a process of controlling, by the server, a device of one region according to various embodiments of the present disclosure.

FIG. 3 is a diagram illustrating a process of controlling, by a server, a device of one region according to an embodiment of the present disclosure.

Referring to FIG. 3, in operation S301, the gateway 110 of the first region 1 may acquire the situation information of the first region 1. The situation information may be information for determining a state of a user and may be, for example, motion information of the user in the first region 1, noise information of the first region 1, operation information of the device of the first region 1, illumination information of the first region 1, door open/close information of the first region 1, or the like. Here, the noise information of the first region 1 may also be, for example, noise information of a specific device of the first region 1, noise information of all devices of the first region 1, or noise information of the whole first region 1.

In operation S302, the gateway 110 of the first region 1 acquiring the situation information may transmit the situation information of the first region 1 to the server 100.

The server 100 receiving the situation information of the first region 1 may determine the state of the user in the first region 1 on the basis of the situation information received in operation S303. For example, the server 100 may determine whether the user in the first region 1 is present or absent. Alternatively, the server 100 may determine a position of the user in the first region 1.

Alternatively, the server 100 may also acquire information of the user in the first region 1 from a memory of the server 100 or the gateway 110 of the first region 1. The information of the user in the first region 1 may be, for example, information on a sex, an age, nationality, and a symptom of a user or the number of users using the first region 1. Further, the server 100 may also acquire characteristic information of the first region 1 from the memory of the server 100 or the gateway 110 of the first region 1. The characteristic information of the first region 1 may be, for example, information on a kind (for example, kind of rooms) of the first region 1 or a size of the first region 1, a main user in the first region 1, a thickness/material of a wall of the first region 1, the number of floors of the first region 10, a structure of the first region 1, a use frequency of the first region 1, or the like. Further, the characteristic information of the first region 1 may be, for example, information on whether the first region 1 is a space shared by an unspecified number of users or is an independent space used by only one person or shared by a few users.

In this case, the server 100 may determine the state of the user in the first region 1 on the basis of the information on the user in the first region 1 or the characteristic information of the first region 1, in addition to the received situation information of the first region 1.

In operation S304, the server 100 may determine the device set-up value of the device 200 of the second region 2 adjacent to the first region 1 on the basis of the state of the user. For example, the server 100 may determine the maximum volume level or the maximum operation level of the device 200 of the second region 2 corresponding to the state of the user as device set-up value of the device 200 of the second region 2.

For example, if it is determined that the user is not present in the first region 1, the server 100 may set the maximum volume level of the device 200 of the second region 2 to be the maximum volume level that the device 200 may output.

On the other hand, if it is determined that the user in the first region 1 is present, the server 100 may set the maximum volume level of the device 200 of the second region 2 to be a value smaller than the maximum volume level that the device 200 may output.

For example, when the device 100 is TV, if the maximum volume level that the TV may output is 40 levels, the server 100 may determine the maximum volume level of the TV as 15 to 25 levels that are about 50% of the maximum volume level. Alternatively, when the device 200 is an electronic piano, if the maximum volume level that the electronic piano may output is 30 levels, the server 100 may determine the maximum volume level of the electronic piano as 10 to 20 levels that are about 50% of the maximum volume level. Alternatively, when the device 200 is a washing machine, if a level in which the washing machine may be operated ranges from 0 to 5 levels, the server 100 may determine the maximum operation level of the washing machine as 2 to 3 levels that is about 50% of the operable level.

Meanwhile, the server 100 may also determine the device set-up value of the device 200 of the second region 2 on the basis of a noise level that may be generated in the second region 2. For example, the server 100 may determine the device set-up value of the device 200 of the second region 2 so that the noise that may be generated in the second region 2 is equal to or less than a predetermined value (for example, 50 dB). Alternatively, the server 100 may determine device set-up values of a plurality of devices of the second region 2 so that the noise that may be generated in the second region 2 is equal to or less than a predetermined value (for example, 50 dB). That is, the server 100 may set the device set-up values of the plurality of devices of the second region 2 so that a sum of noises that are generated by the plurality of devices is equal to or less than a predetermined value.

In this case, the server 100 may use the noise detection sensor of the second region 2 to measure the noise levels that are generated by the plurality of devices in the second region 2. Further, if the noise level is equal to or more than a predetermined size depending on the measured noise level, the server 100 may determine the device set-up values of the plurality of devices, respectively, of the second region 2.

The server 100 that determines the device set-up value of the device 200 of the second region 2 adjacent to the first region 1 may transmit the device set-up value of the second region 2 determined in operation S304 to the device 200 of the second region 2 in operation S305. Alternatively, the server 100 may transmit the set device set-up value of the second region 2 to the gateway 110 of the second region 2. The gateway 110 of the second region 2 may again transmit the received device set-up value of the second region 2 to the device 200 of the second region 2.

The device 200 of the second region 2 receiving the device set-up value may set the maximum output level depending on the device set-up value in operation S306.

In operation S307, the device 200 of the second region 2 may receive the user input. For example, when the device 200 of the second region 2 is TV, the user input may be a near field communication (NFC) input through a remote controller, a touch input, a speech input, a button input, an eye-gaze input, a gesture input, or the like.

In operation S308, the device 200 of the second region 2 may determine whether a device manipulation value by the user input exceeds an output limit value that is the maximum output level set by the device set-up value received by the server 100.

If it is determined that the device manipulation value by the user input is equal to or more than the output limit value (S308—YES), in operation S309, the device 200 of the second region 2 may provide notice information indicating that the output of the device 200 is limited. For example, the device 200 of the second region 2 may display notice information like 'if a user turns up a volume further, a floor noise problem may occur' on the display unit. Alternatively, the device 200 of the second region 2 may output the notice information in a speech form through a speaker.

On the other hand, if it is determined that the device manipulation value by the user input is less than the output limit value (S308—YES), in operation S310, the device of the second region 2 may be operated depending on the device manipulation value by the user input.

Figure 4:
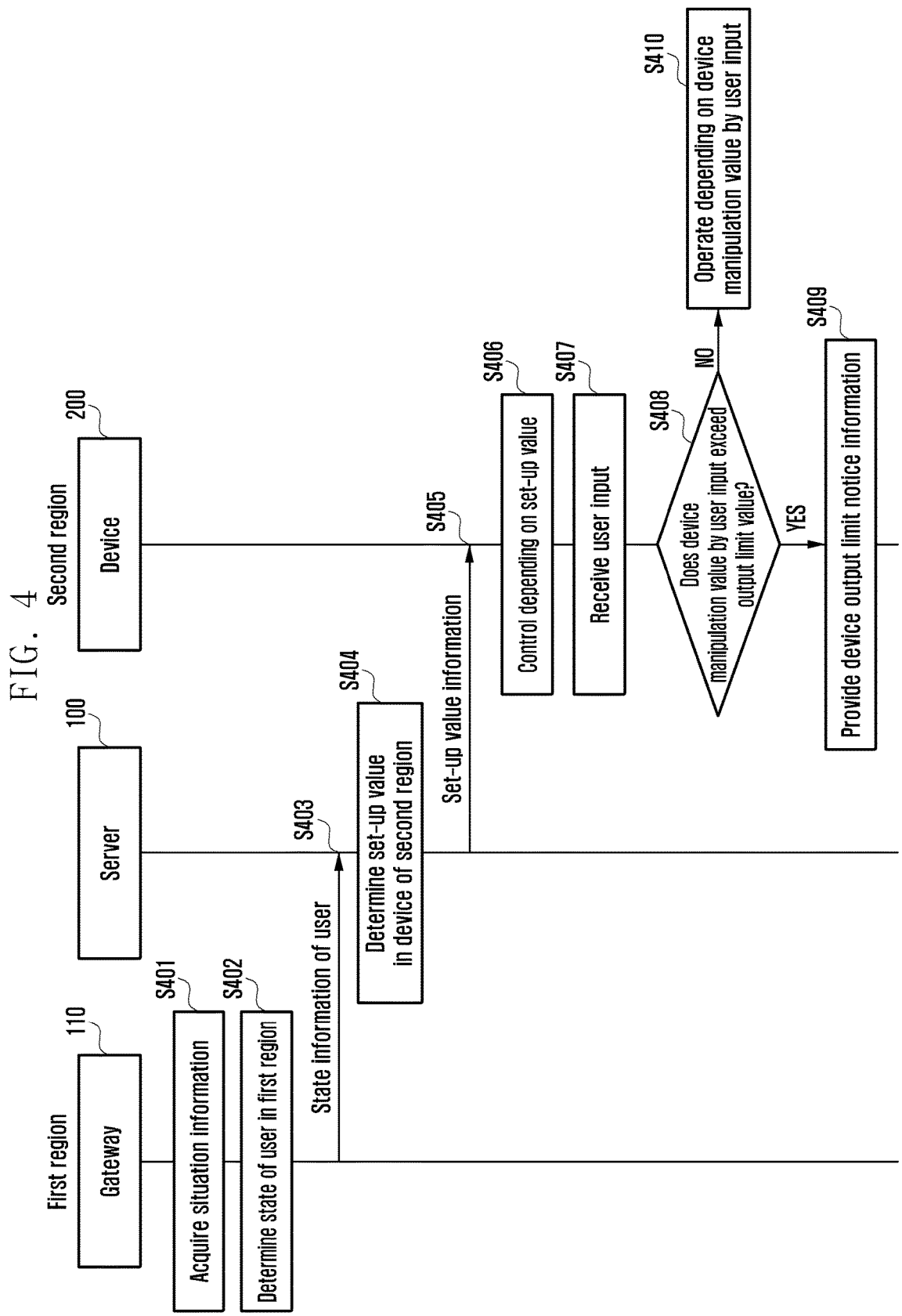

FIG. 4 is a diagram illustrating a process of controlling, by a server, a device of one region according to an embodiment of the present disclosure.

Referring to FIG. 4, in operation S401, the gateway 110 of the first region 1 may acquire the situation information of the first region 1.

The gateway 110 of the first region 1 acquiring the situation information of the first region 1 may determine the state of the user in the first region 1 on the basis of the situation information of the first region 1 acquired in operation S402. For example, the gateway 110 of the first region 1 may determine whether the user is present or absent. Alternatively, the gateway 110 of the first region 1 may acquire the position of the user in the first region 1.

In operation S403, the gateway 110 of the first region 1 may acquire the determined state information of the user in the first region 1 to the server 100.

The server 100 receiving the state information of the user may determine at least one device set-up value of the second region 2 adjacent to the first region 1 on the basis of the state of the user determined in operation S404.

Hereinafter, operations S405 to S410 of FIG. 4 correspond to operations S305 to S310 of FIG. 3, and therefore the description of operations S405 to S410 will be omitted.

Figure 5:
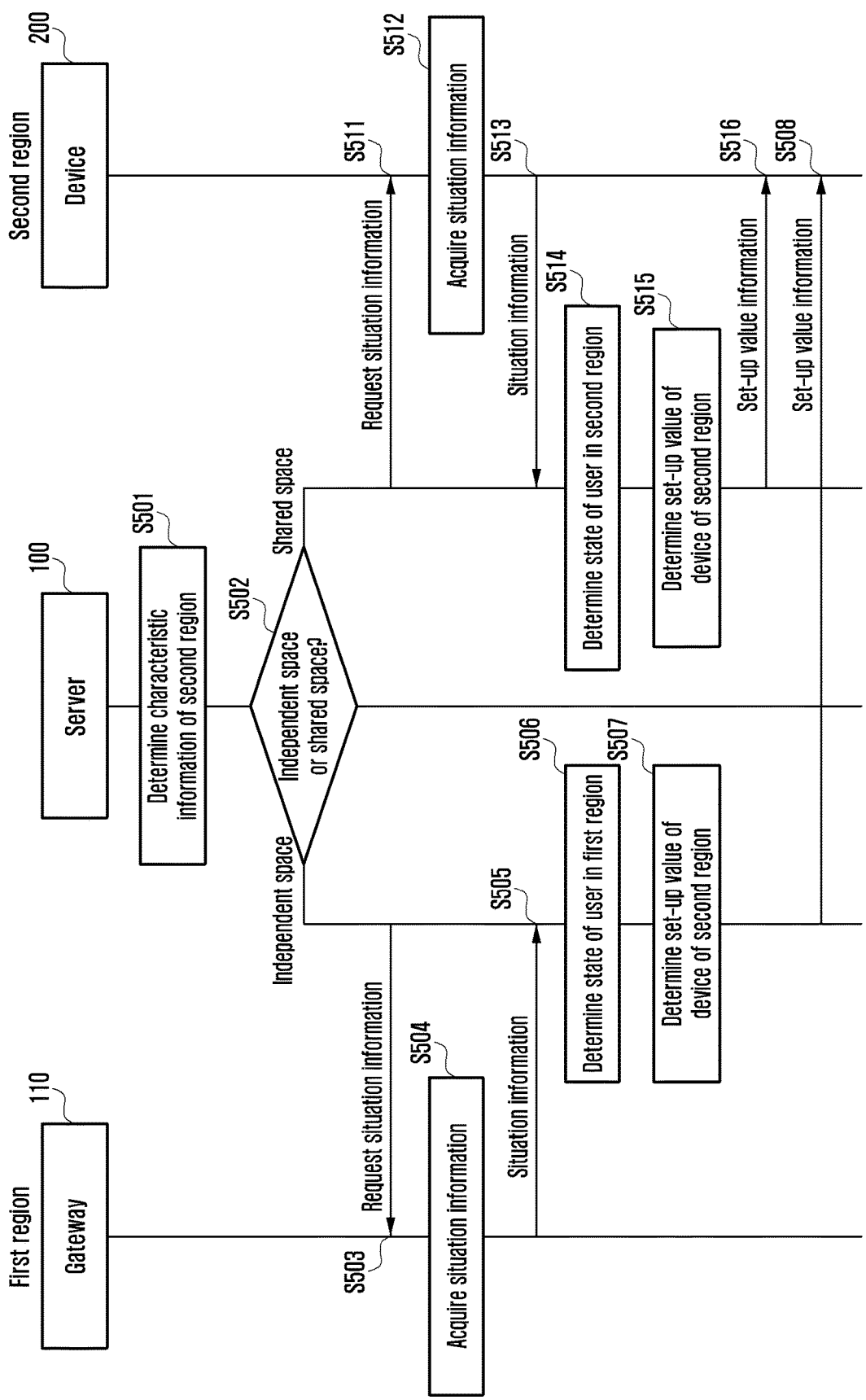

FIG. 5 is a diagram illustrating a process of controlling, by a server, a device of one region according to an embodiment of the present disclosure.

Referring to FIG. 5, in operation S501, the server 100 may determine characteristic information of the second region 2. The characteristic information of one region may be, for example, information associated with a user behavior in one region on whether one region is a space shared by an unspecified number of users or is an independent space used by only one person or shared by a few users. The space shared by an unspecified number of users may be, for example, a lobby of a hotel, a school, a gym, a wedding hall, a restaurant, or the like. Further, the independent space shared by only one person or a few users may be, for example, a room of a hotel, a consulting room of a hospital, a private office, a house in which one generation of an apartment resides, or the like.

The server 100 may also acquire the characteristic information of the second region 2 from the memory of the server 100 and may also acquire the characteristic information of the second region 2 from the gateway 110 of the second region 2.

In operation S502, the server 100 may determine whether the second region is the shared space or the independent space on the basis of the characteristic information of the second region 2.

As the determination result, if the second region is determined to be the independent space, the server 100 may acquire the situation information of the first region 1 adjacent to the second region.

To acquire the situation information of the first region 1, the server 100 may request the situation information of the first region 1 to the gateway 110 of the first region 1 in operation S503.

In operation S504, the gateway 110 of the first region 1 receiving the request of the situation information from the server 100 may acquire the situation information of the first region 1.

The gateway 110 of the first region 1 acquiring the situation information of the first region 1 may transmit the situation information of the first region 1 acquired in operation S505 to the server 100.

In operation S506, the server 100 may determine the state of the user in the first region 1 on the basis of the received situation information of the first region 1.

Further, the server 100 may also acquire the information on the user in the first region 1 or the characteristic information of the first region 1 from the memory of the server 100 or the gateway 110 of the first region 1. In this case, the server 100 may determine the state of the user in the first region 1 on the basis of the information on the user in the first region 1 or the characteristic information of the first region 1, in addition to the acquired situation information of the first region 1.

In operation S507, the server 100 may determine the device set-up value of the device 200 of the second region 2 on the basis of the determined state of the user in the first region 1.

In operation S508, the server 100 may transmit the determined device set-up value to the device of the second region 2. Alternatively, the server 100 may transmit the determined device set-up value to the device 200 of the second region 2 through the gateway 110 of the second region 2.

Meanwhile, in operation S502, the server 100 may also determine that the second region 2 is the shared space.

If it is determined that the second region 2 is the shared space, the server 100 may acquire the situation information of the second region 2.

To acquire the situation information, the server 100 may request the situation information of the second region 2 to the gateway 110 of the second region 2 in operation S511.

In operation S512, the gateway 110 of the second region 2 receiving the request of the situation information from the server 100 may acquire the situation information of the second region 2.

In operation S513, the gateway 110 of the second region 2 may transmit the acquired situation information of the second region 2 to the server 100.

In operation S514, the server 100 may determine the state of the user in the second region 2 on the basis of the situation information of the second region 2.

Further, the server 100 may also acquire the information on the user in the second region 2 or the characteristic information of the second region 2 from the memory of the server 100 or the gateway 110 of the second region 2. In this case, the server 100 may determine the state of the user in the second region 2 on the basis of the acquired information on the user in the second region 2 or the characteristic information of the second region 2, in addition to the acquired situation information of the second region 2.

In operation S515, the server 100 may determine the device set-up value of the device 200 of the second region 2 on the basis of the determined state of the user in the second region 2.

In operation S516, the server 100 may transmit the determined device set-up value to the device of the second region 2. Alternatively, the server 100 may transmit the determined device set-up value to the device 200 of the second region 2 through the gateway 110 of the second region 2.

Figure 6:
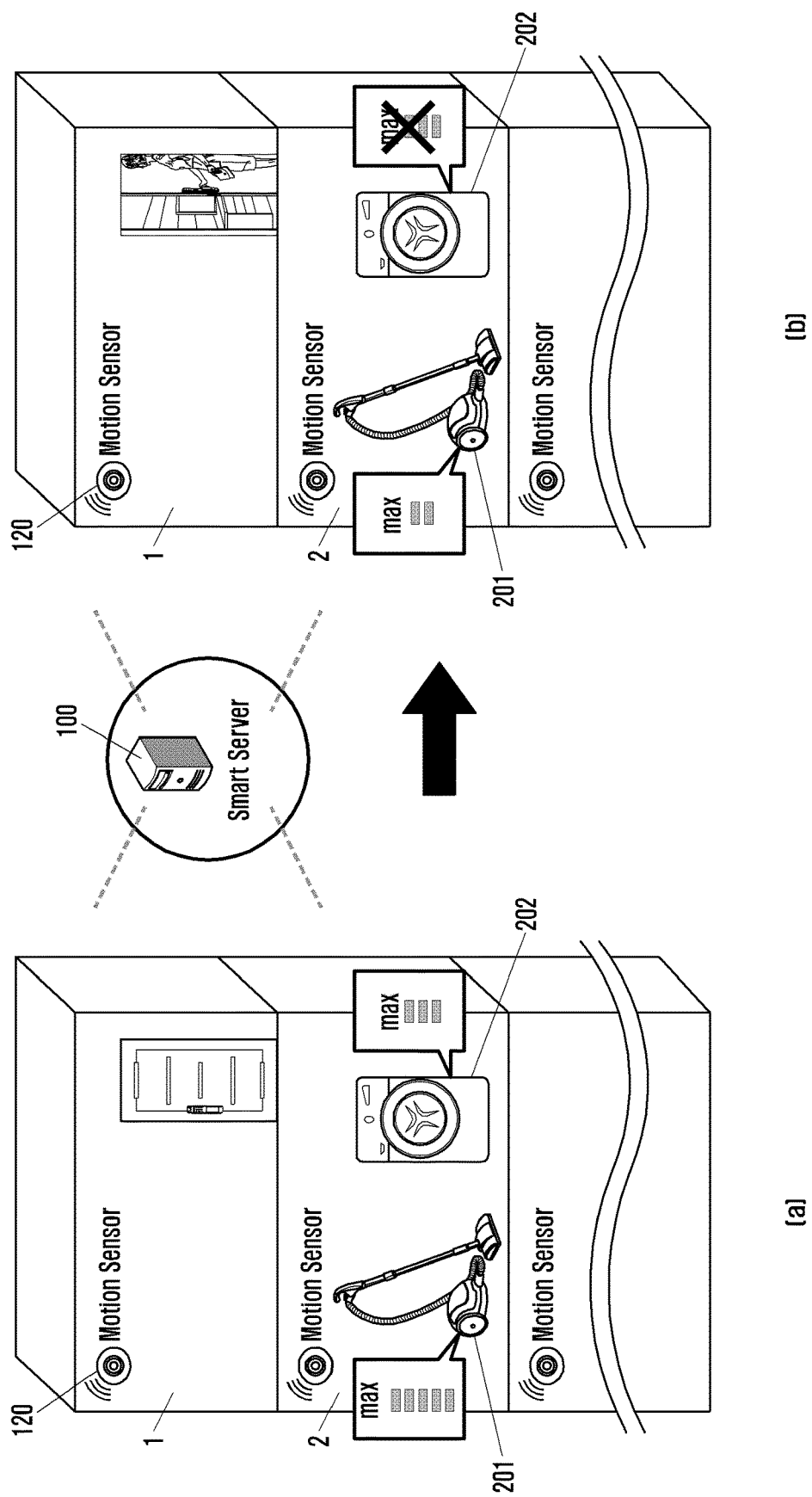
FIG. 6 illustrates diagrams [a] and [b] of a situation in which a server controls a device of one region according to various embodiments of the present disclosure.

FIG. 6 illustrates diagrams [a] and [b] of a situation in which a server controls a device of one region according to an embodiment of the present disclosure.

Referring to diagram [a] of FIG. 6, the user in the second region 2 who comes home in the evening may want to operate the devices 201 and 202 (for example, cleaner, washing machine) which cause noise. In this case, the user in the second region 2 may query whether the devices 201 and 202 may be used through the gateway 110 of the second region 2. For example, the user in the second region 2 may query whether the devices 201 and 202 may be used through a user interface provided by the device (for example, TV) serving as the gateway 110.

In response to the user query, the gateway 110 of the second region 2 may transmit information requesting whether the devices 201 and 202 may be used to the server 100.

According to the request, the server 100 may acquire the situation information of the first region 1. For example, the server 100 may acquire the situation information of the first region 1 from the gateway 110 of the first region 1.

The server 100 may determine that the user in the first region 1 is absent on the basis of the acquired situation information of the first region 1. For example, if the motion of the user in the first region 1 is not detected for a predetermined time, the server 100 may determine that the user in the first region 1 is absent in the first region 1.

If it is determined that the user in the first region 1 is absent, the server 100 may determine the device set-up values of the devices 201 and 202 of the second region 2 corresponding to the state in which the user is absent.

For example, when the device 201 of the second region 2 is the cleaner, the server 100 may determine the maximum operation level in which the cleaner 201 may be operated. For example, when the level in which the cleaner 201 may be operated ranges from 0 to 5 levels, the server 100 may set the maximum operation level of the cleaner to be level 5. Alternatively, when the device 202 of the second region 2 is the washing machine, the server 100 may determine the maximum operation level in which the washing machine 202 may be operated. For example, if the level in which the washing machine 202 may be operated ranges from 0 to 3 levels, the server 100 may set the maximum operation level of the washing machine to be level 2. That is, even when the user in the adjacent first region 1 is absent, the server 100 does not always set the maximum operation level of the device to 3 that is a maximum value in the range in which the device may be operated but may not adjust the maximum operation level of the device in consideration of evening time.

The server 100 may transmit the determined device set-up values to the gateway of the second region 2. The gateway 110 may provide notice information indicating the maximum operation level in which the devices 201 and 202 may be operated. For example, the gateway 110 may display notice information like 'the washing machine may be operated up to level 2 and the cleaner may be operated up to level 5' on the display unit. Alternatively, the gateway 110 may output the notice information in the speech form through the speaker.

Alternatively, the server 100 may directly transmit the device set-up values of the devices 201 and 202 to the devices 201 and 202. Alternatively, the server 100 may directly transmit the device set-up values of the devices 201 and 202 to the devices 201 and 202 through the gateway 110.

When the devices 201 and 202 of the second region 2 include the display unit, the devices 201 and 202 of the second region 2 receiving the device set-up values may provide notice information indicating the maximum operation level that may operate the devices 201 and 202 through the display unit.

Alternatively, the devices 201 and 202 of the second region 2 may set the maximum volume level depending on the received device set-up value. For example, the cleaner 201 among the devices 201 and 202 of the second region 2 may set the maximum operation level that may be operated to be level 5. Further, the washing machine 202 may set the maximum operation level that may be operated to be level 2.

Meanwhile, referring to diagram [b] of FIG. 6, the user in the second region 2 who comes home in the evening in a few days may want to again operate the devices 201 and 202 which cause noise. In this case, the user in the second region 2 may again query whether the devices 201 and 202 may be used through the gateway 110.

In response to the user query, the gateway 110 may transmit information requesting whether the devices 201 and 202 may be used to the server 100.

Therefore, the server 100 may acquire the situation information of the first region 1. For example, the server 100 may acquire the situation information of the first region 1 from the gateway 110 of the first region 1.

The server 100 may determine that the user in the first region 1 is present on the basis of the acquired situation information of the first region 1. For example, if the motion of the user in the first region 1 is detected, the server 100 may determine that the user in the first region 1 is present in the first region 1.

If it is determined that the user in the first region 1 is present, the server 100 may determine the device set-up values of the devices 201 and 202 of the second region 2 corresponding to the state in which the user is present.

For example, when the device 201 of the second region 2 is the cleaner, the server 100 may determine the maximum operation level in which the cleaner 201 may be operated. For example, when the level in which the cleaner 201 may be operated ranges from 0 to 5 levels, the server 100 may set the maximum operation level to be level 2. Further, since the washing machine 202 is expected to greatly disturb the user in the second user 2 in the evening, the server 100 may set the maximum level in which the washing machine 202 may be operated to be level 0 at which the operation may not be performed.

The server 100 may transmit the determined device set-up values to the gateway of the second region 2. The gateway 110 may provide notice information indicating the maximum operation level in which the devices 201 and 202 may be operated. For example, the gateway 110 may display notice information like 'the washing machine may not be operated and the cleaner may be operated up to level 2" on the display unit. Alternatively, the gateway 110 may output the notice information in the speech form through the speaker.

Alternatively, the server 100 may directly transmit the determined device set-up values of the devices 201 and 202 to the devices 201 and 202. Alternatively, the server 100 may directly transmit the device set-up values of the devices 201 and 202 to the devices 201 and 202 through the gateway 110.

When the devices 201 and 202 of the second region 2 include the display unit, the devices 201 and 202 of the second region 2 receiving the device set-up values may provide notice information indicating the maximum operation level that may operate the devices 201 and 202 through the display unit.

Alternatively, the devices 201 and 202 of the second region 2 may limit the maximum operation level depending on the received device set-up value. For example, the cleaner 201 among the devices 201 and 202 of the second region 2 may set the maximum operation level that may be operated to be level 2. Further, the washing machine 202 among the devices 201 and 202 may not be operated.

Figure 7:
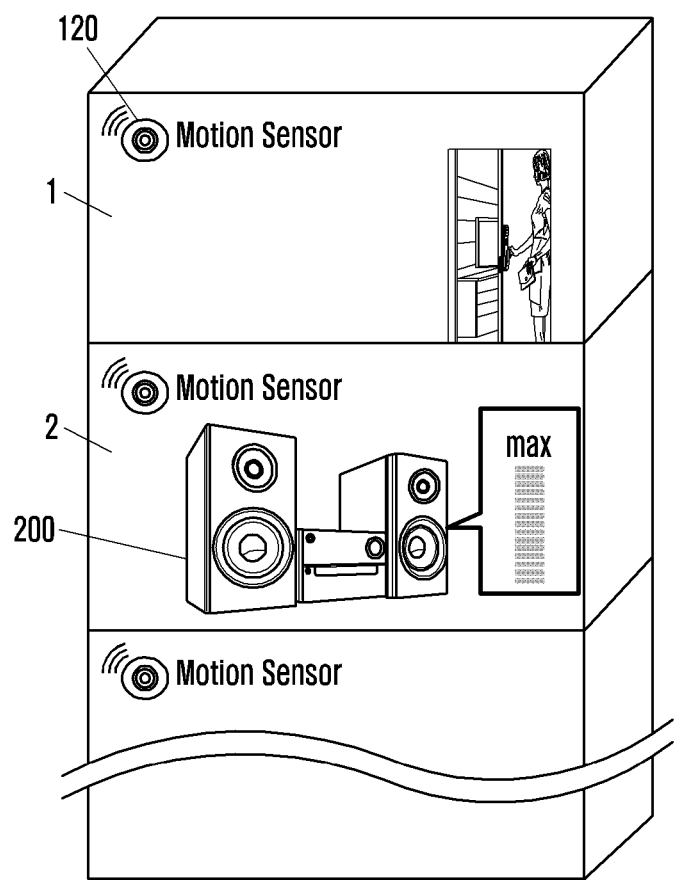
FIGS. 7 and 8 illustrate a situation in which a server controls a device of one region according to various embodiments of the present disclosure.

FIG. 7 is a diagram illustrating a situation in which a server controls a device of one region according to an embodiment of the present disclosure.

Referring to FIG. 7, the user in the second region 2 who comes home in the evening may want to manipulate the sound output devices (for example, audio) 200.

For example, the user in the second region 2 may manipulate the volume of the device 200 that may be operated from 0 to 10 levels to be level 7.

As the user manipulates the device, the gateway 110 of the second region 2 may receive the manipulation information of the device 200. Further, the gateway 110 of the second region 2 may transmit the maximum operation level of the device that the user may manipulate to the server 100.

According to the request, the server 100 may acquire the situation information of the first region 1. The server 100 may determine that the user in the first region 1 is present on the basis of the acquired situation information of the first region 1. For example, if the motion of the user in the first region 1 is detected, the server 100 may determine that the user in the first region 1 is present in the first region 1.

If it is determined that the user in the first region 1 is present, the server 100 may determine the device set-up value of the device 200 of the second region 2 corresponding to the state in which the user is present.

For example, when the device 200 of the second region 2 is the audio, the server 100 may determine the maximum operation level in which the audio 200 may be operated. For example, when the level in which the audio 200 may be operated ranges from 0 to 20 levels, the server 100 may set the maximum operation level of the audio 200 to be level 16. In this case, the server 100 may determine the maximum operation level in which the device may be operated, in consideration of a current time in addition to the state of the user in the first region 1.

The server 100 may transmit the determined device set-up value to the device 200 of the second region 2. Alternatively, the server 100 may transmit the determined device set-up value to the device 200 of the second region 2 through the gateway 110 of the second region 2.

In this case, if the volume manipulated by the user is level 7, the device 200 of the second region 2 may provide notice information indicating that the volume level may be further turned up. For example, the device 200 of the second region 2 may display notice information like "it is allowed to further turn up a volume at a current time". Alternatively, the device 200 of the second region 2 may output the notice information in a speech form through a speaker.

The user may turn up the volume level by considering the notice information. However, the situation in which the user turns up the volume to be level 19, exceeding the level 16 which is the maximum operation level.

In this case, the device 200 of the second region 2 may provide notice information requesting the limit of the volume. For example, the device 200 of the second region 2 may provide notification information like "the current volume is so high so as to cause a disturbance due to the floor noise. As a result, the volume of level 16 is suggested".

Alternatively, when the user of the device 200 of the second region 2 increases the operation level to exceed the set maximum operation level, the user may perform a control to prevent the operation level from being increased.

The user may again reduce the volume level on the basis of the suggested notice information. For example, the user may manipulate the volume level of the device 200 of the second region 2 to be level 16 not exceeding the level 16 that is the maximum operation level.

As a result, the user may manipulate the volume level of the audio at ease without paying attention to the surrounding.

Figure 8:
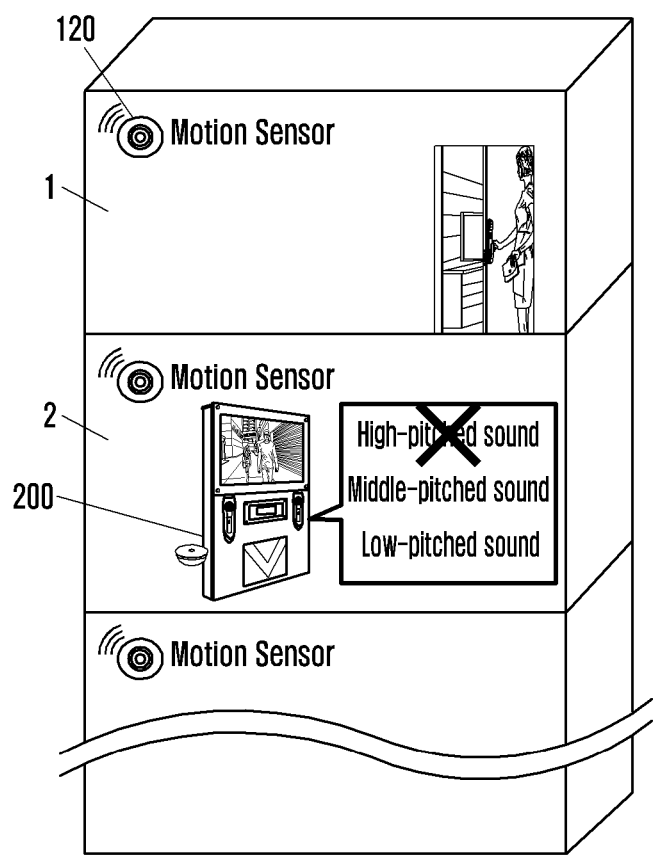

FIG. 8 is a diagram illustrating a situation in which a server controls a device of one region according to an embodiment of the present disclosure.

Referring to FIG. 8, the user in the second region 2 who comes home in the evening may want to manipulate the sound output devices (for example, karaoke room equipment) 200.

For example, the user in the second region 2 may manipulate the device 200 in an off state to be an on state.

As the user manipulates the device, the gateway 110 of the second region 2 may receive the manipulation information of the device 200. Further, the gateway 110 of the second region 2 may transmit the maximum operation level of the device that the user may manipulate to the server 100.

According to the request, the server 100 may acquire the situation information of the first region 1. The server 100 may determine that the user in the first region 1 is present on the basis of the acquired situation information of the first region 1. For example, if the motion of the user in the first region 1 is detected, the server 100 may determine that the user in the first region 1 is present in the first region 1.

If it is determined that the user in the first region 1 is present, the server 100 may determine the device set-up value of the device 200 of the second region 2 corresponding to the state in which the user is present.

For example, when the device 200 of the second region 2 is the karaoke room equipment, the server 100 may determine the operation limit level indicating a register for inhibiting an output among registers in which the karaoke room device 200 may be output to be the device set-up value. That is, if the operation level of the karaoke equipment 200 is a 'low register', 'middle register', and 'high register', the server 100 may set the operation limit level that is the device set-up value to be the 'high register' to inhibit the output of the high register, thereby preventing the floor noise.

The server 100 may transmit the determined device set-up value to the device 200 of the second region 2. Alternatively, the server 100 may transmit the determined device set-up value to the device 200 of the second region 2 through the gateway 110 of the second region 2.

In this case, the device 200 of the second region 2 may provide notice information indicating that a register in which the user may be sung is limited. For example, the device 200 of the second region 2 may display notice information like 'the high register may cause a disturbance due to the floor noise' on the display unit. Alternatively, the device 200 of the second region 2 may output the notice information through the speaker.

Figure 9:
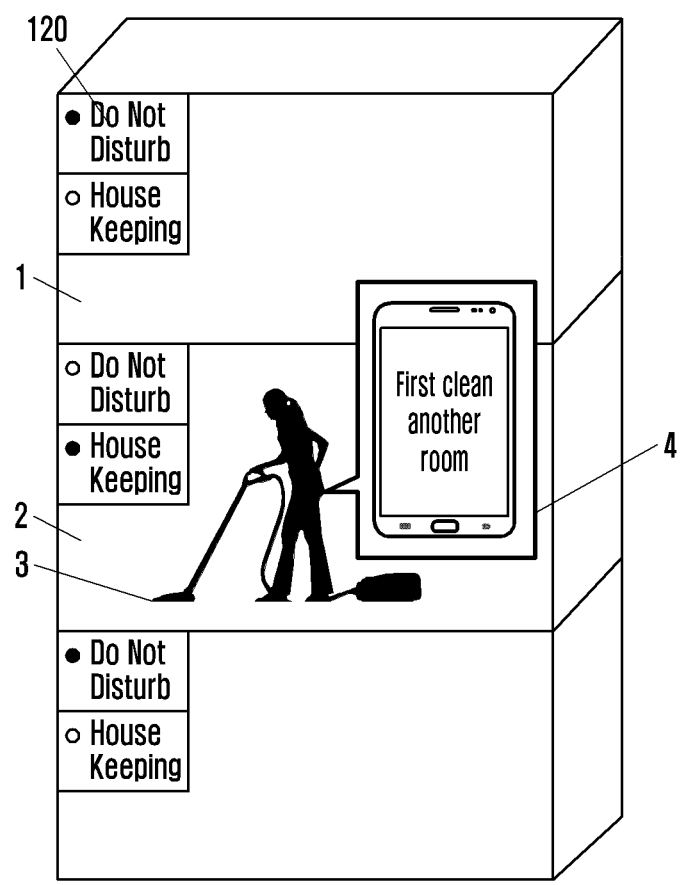
FIG. 9 is a diagram illustrating a situation in which a server provides a state of a user in one region according to an embodiment of the present disclosure.

FIG. 9 is a diagram illustrating a situation in which a server provides the state of the user in one region according to an embodiment of the present disclosure.

Referring to FIG. 9, a housekeeper 3 may want to clean the second region 2.

Therefore, the housekeeper 3 may enter and exit the second region 2 to clean the second region 2. In this case, the sensor (for example, door open and close detection sensor)

(not illustrated) of the second region 2 may provide entrance information of the housekeeper to the gateway 110 of the second region 2.

The gateway 110 of the second region 2 may receive the entrance information. Further, the gateway 110 of the second region 2 receiving the entrance information may transmit the information requesting the state of the user in the first region 1 adjacent to the second region 2 to the server 100.

According to the request, the server 100 may acquire the situation information of the first region 1. The server 100 may determine the state of the user in the first region 1 on the basis of the acquired situation information of the first region 1. For example, the server 100 may determine that the state of the user in the first region 1 is in a 'disturb inhibition request' state.

The server 100 may determine a message corresponding to the state of the user. For example, the server 100 may determine a message requesting the housekeeper 3 to first clean another room among various kinds of messages associated with the state of the user as a message corresponding to the 'disturb inhibition request' state.

The server 100 may transmit the determined message to a portable device 4 of the housekeeper 3. The portable device 4 receiving the message may provide notice information limiting the cleaning of the room of the first region 1 to the housekeeper not to disturb the user in the first region 1. For example, the portable device 4 may display notice information like 'first clean another room' on the display unit. Alternatively, the portable device 4 may output the notice information through the speaker.

Alternatively, the server 100 acquiring the situation information of the second region 2 may determine the maximum operation of the operating device 200 (for example, cleaner) that the housekeeper 3 may operate. In this case, if the level in which the cleaner may be operated ranges from 0 to 5 levels, the maximum operation level may be set to be level 0 at which the operation may not be performed or to be equal to or less than level 2 at which noise is little generated.

Figure 10:
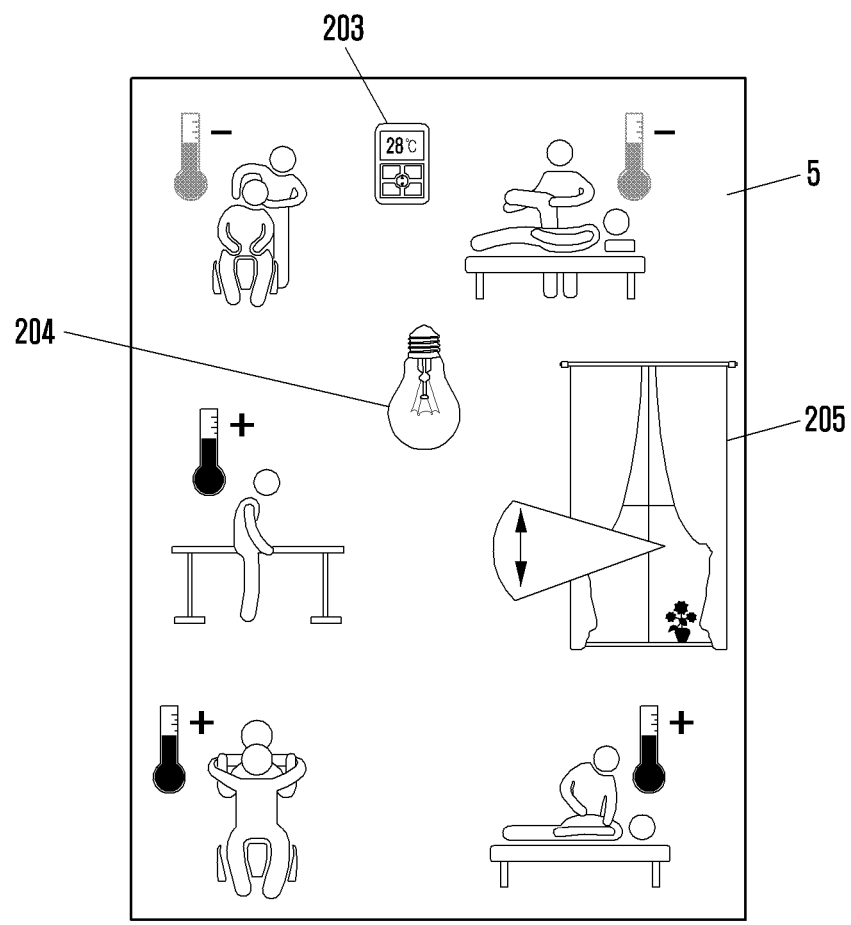
FIG. 10 is a diagram illustrating the situation in which a server controls the device of one region according to an embodiment of the present disclosure.

FIG. 10 is a diagram illustrating a situation in which a server controls a device of one region according to an embodiment of the present disclosure.

Referring to FIG. 10, one region 5 may be a shared space that multiple users use. For example, the one region 5 may be a ward in which multiple patients are accommodated.

In FIG. 10, the server 100 may acquire the state of multiple users in the one region 5. For example, the server 100 may acquire information on disease symptoms of patients from the memory of the server 100.

Next, the server 100 may determine the device set-up values of devices (for example, temperature controller 203, lighting installation 204, a curtain controller 205, or the like) of the one region 5 on the basis of the acquired state of the users. For example, if a patient is a cold patient or a body ache patient, a ward needs to keep warm. Further, if a patient is a burn patient, a ward needs to keep cold. Further, if a patient is a surgical patient, a physical function is weak, and therefore it takes time to relax and contract pupils, such that there is a need to make time to automatically open a curtain for exposure to sun slow. Therefore, the server 100 may determine a required temperature set-up value, lighting set-up value, and curtain open time that are required for multiple users, respectively.

For example, when the temperature set-up value is determined, the server 100 may determine an average value of temperatures required for multiple users as the temperature set-up value.

If the device set-up values of the devices 203 to 205 of the one region 5 are determined, the server 100 may transmit the determined device set-up values to the devices 203 to 205 of the one region. Alternatively, the server 100 may transmit the determined device set-up values to the devices 203 to 205 of the one region 5 through the gateway 110 of the one region.

The devices 203 to 205 of the one region receiving the set-up values may be operated depending on the device set-up value. For example, the temperature controller 203 may be operated depending on the determined temperature set-up value. Further, the lighting installation 204 may be operated depending on the determined lighting set-up value. Further, the curtain controller 205 may be operated depending on the determined curtain open time.

As such, the devices 203 to 205 of one region that multiple users use are operated on the basis of characteristics of multiple users, such that indoor satisfaction of multiple users may be increased. That is, it may help recover illness from patients within a ward.

Figure 11A:
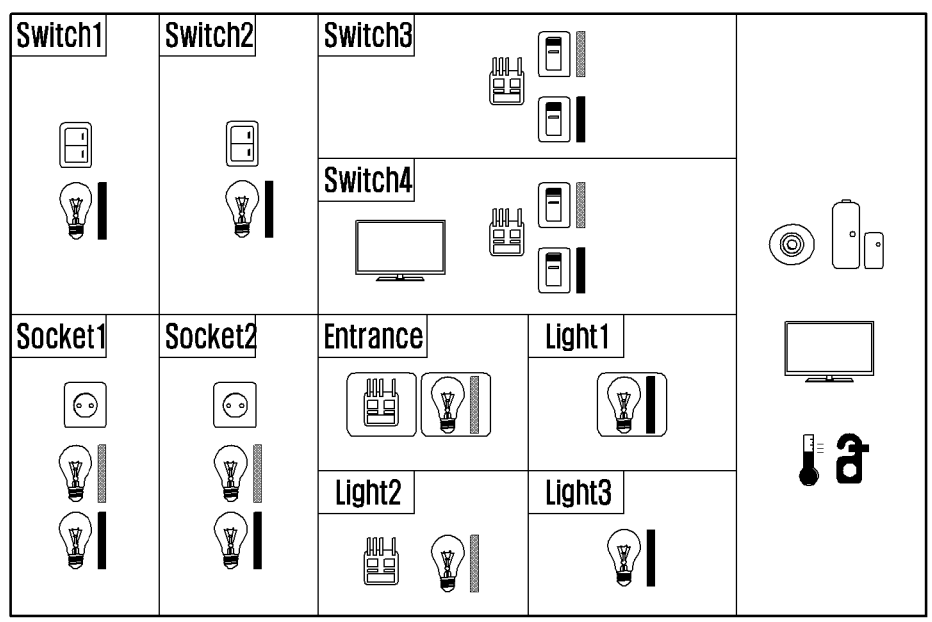
FIGS. 11A and 11B are diagrams illustrating a device set-up value depending on a size of one region according to various embodiments of the present disclosure.
Figure 11B:
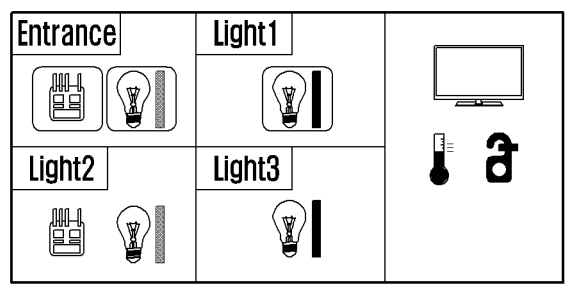

FIGS. 11A and 11B are diagrams illustrating a set-up value of a device depending on a size of one region according to various embodiments of the present disclosure.

Referring to FIGS. 11A and 11B, a size of region in FIG. 11A may be larger than that of FIG. 11B. For example, in FIGS. 11A and 11B, the region of FIG. 11A may be a suite room of a hotel and the region of FIG. 11B may be a deluxe room or a standard room of a hotel.

In this case, the device set-up values of the devices of FIG. 11A and the device set-up values of the devices of FIG. 11B may be set to be different from each other. That is, since the region of FIG. 11A has a relatively larger size, noise generated from devices of the region of FIG. 11A may cause relatively less disturbance to adjacent regions (for example, other rooms of a hotel). On the other hand, since the region of FIG. 11B has a relatively smaller size, the noise generated from the device of the region of FIG. 11B may cause relatively higher disturbance to adjacent regions. Therefore, the device set-up values of the regions of FIGS. 11A and 11B need to be determined differently.

The following Table 2 shows examples of the device set-up values in which the devices in FIGS. 11A and 11B may be operated when the users in the adjacent regions are present.

TABLE 2

| Kind of devices | Region of FIG. 11A | Region of FIG. 11B |
| --- | --- | --- |
| TV | Level 30 | Level 25 |
| Audio | Level 30 | Level 25 |
| Cleaner | Level 5 | Level 3 |

In the above Table 2, if it is determined that the users in the region of FIG. 11A and the regions adjacent thereto are present, the server 100 may determine the maximum volume level of the TV of the region of FIG. 11A to be level 30, the maximum volume level of the audio to be level 30, and the maximum operation level of the cleaner to be level 5. Further, if it is determined that the users in the region of FIG. 11B and the regions adjacent thereto are present, the server 100 may determine the maximum volume level of the TV of the region of FIG. 11B to be level 25, the maximum volume level of the audio to be level 25, and the maximum operation level of the cleaner to be level 3.

That is, the server 100 may receive the information on the size of the region and if it is determined that the users in the adjacent regions are present, the device set-up values may be differently set depending on the size of the region, thereby reducing the floor noise.

Figure 12A:
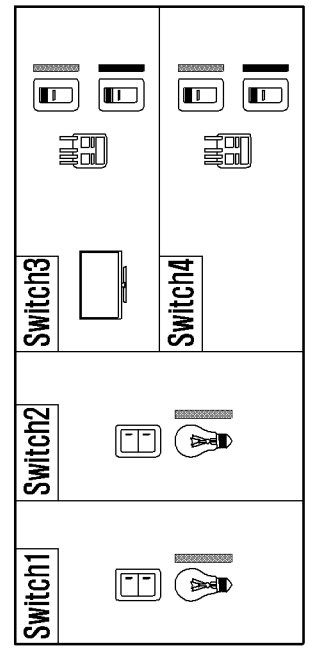
FIGS. 12A and 12B are diagrams illustrating a device set-up value depending on a structure of one region according to various embodiments of the present disclosure.
Figure 12B:
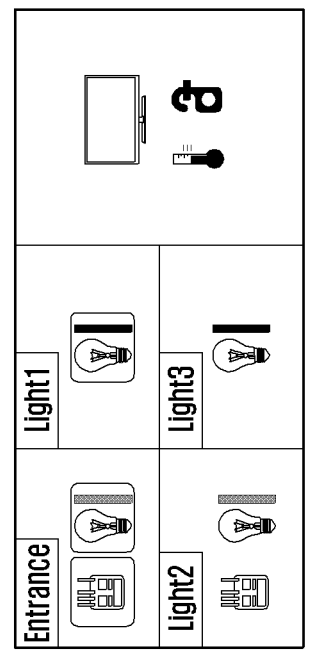

FIGS. 12A and 12B are diagrams illustrating a set-up value of a device depending on a structure of one region according to an embodiment of the present disclosure.

Referring to FIGS. 12A and 12B, a design structure of the region of FIG. 12A may be different from that of the region of FIG. 12B. In FIGS. 12A and 12B, the region of FIG. 12A may be partitioned into five rooms and the region of FIG. 12B may be partitioned into four rooms. For example, in FIGS. 12A and 12B, the region of FIG. 12A may be a deluxe room of a hotel and the region of FIG. 12B may be a standard room of a hotel.

In this case, since walls partitioning a room of the region of FIG. 12A may perform a soundproof function, compared to noise generated from the device of the region of FIG. 12B, noise generated from the devices of the region of FIG. 12A may be relatively less transferred to adjacent regions (for example, other rooms of a hotel). Therefore, the device set-up values of the regions of FIGS. 12A and 12B need to be determined differently.

The following Table 3 shows examples of the device set-up values in which the devices in FIGS. 12A and 12B may be operated when the users in the adjacent regions are present.

TABLE 3

| Kind of devices | Region of FIG. 12A | Region of FIG. 12B |
|---|---|---|
| TV | Level 25 | Level 22 |
| Audio | Level 25 | Level 22 |
| Cleaner | Level 3 | Level 2.5 |

In the above Table 3, if it is determined that the users in the region of FIG. 12A and the regions adjacent thereto are present, the server 100 may determine the maximum volume level of the TV of the region of FIG. 12A to be level 25, the maximum volume level of the audio to be level 25, and the maximum operation level of the cleaner to be level 3. Further, if it is determined that the users in the region of FIG. 12B and the regions adjacent thereto are present, the server 100 may determine the maximum volume level of the TV of the region of FIG. 12B to be level 22, the maximum volume level of the audio to be level 22, and the maximum operation level of the cleaner to be level 2.5.

That is, the server 100 may receive the information on the design structure of the region and if it is determined that the users in the adjacent regions are present, the device set-up values may be differently set depending on the design structure, thereby reducing the floor noise.

Figure 13A:
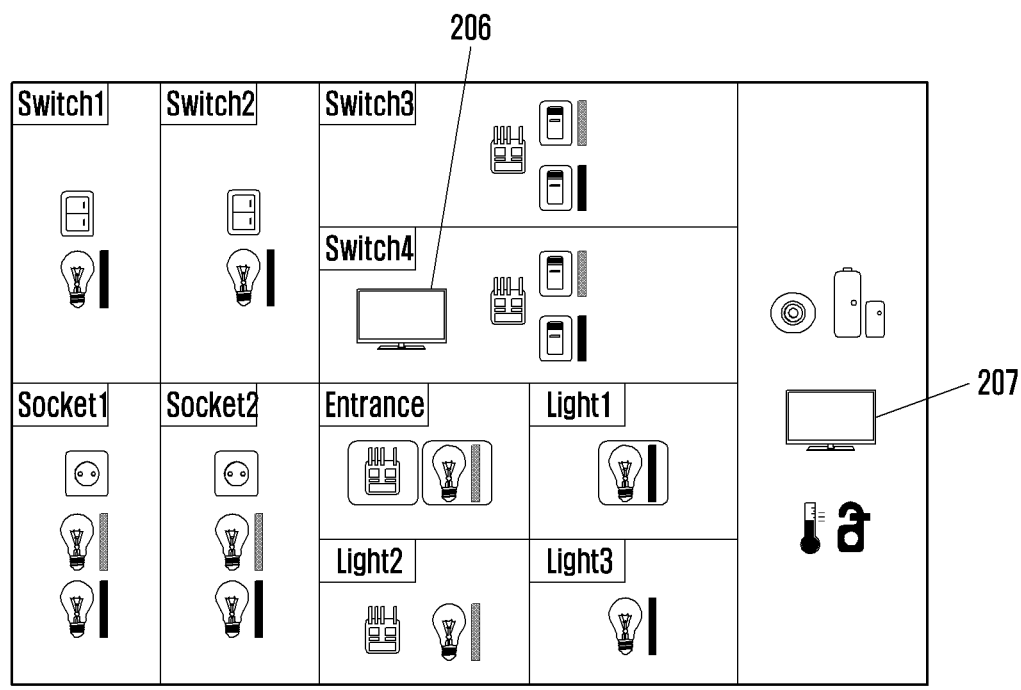
FIGS. 13A and 13B are diagrams illustrating a device set-up value of a device 200 depending on the number of devices of one region according to various embodiments of the present disclosure.
Figure 13B:
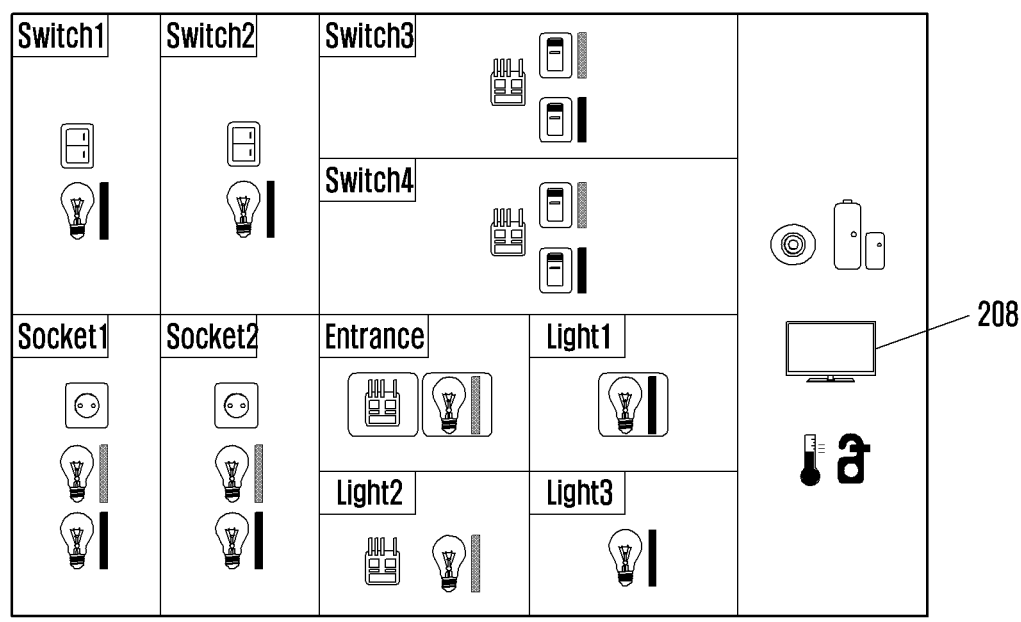

FIGS. 13A and 13B are diagrams illustrating a device set-up value of a device depending on the number of devices of one region according to an embodiment of the present disclosure.

Referring to FIGS. 13A and 13B, the number of devices of the region of FIG. 13A may be different from that of the region of FIG. 13B. For example, the sound output devices (for example, TV) 206 and 207 may be positioned in two rooms, respectively, among a plurality rooms in the region of FIG. 13A. On the other hand, the sound output device (for example, TV) 208 of the region of FIG. 13B may be positioned in one room among a plurality rooms.

In this case, in FIGS. 13A and 13B, noise generated from the devices 206 and 207 of the whole region of FIG. 13A may be larger than that generated from the device 209 of the whole region of FIG. 13B. That is, in FIGS. 13A and 13B, compared to the noise generated from the device 208 of the region of FIG. 13B, the noise generated from the devices 206 and 207 of the region of FIG. 13A may be relatively less transferred to adjacent regions (for example, other rooms of a hotel). Therefore, the device set-up values of the regions of FIGS. 13A and 13B need to be determined differently.

The following Table 4 shows examples of the device set-up values in which users in FIGS. 13A and 13B may operate the devices when the users in the adjacent regions are present.

TABLE 4

| Kind of devices | Region of FIG. 13A | Region of FIG. 13B |
|---|---|---|
| TV | Level 25 | Level 30 |
| Audio | Level 25 | Level 30 |
| Cleaner | Level 3 | Level 5 |

In the above Table 4, if it is determined that the users in the region of FIG. 13A and the regions adjacent thereto are present, the server 100 may determine the maximum volume level of the TVs 206 and 207 of the region of FIG. 13A to be level 25, the maximum volume level of the audio to be level 25, and the maximum operation level of the cleaner to be level 3. Further, if it is determined that the users in the region of FIG. 13B and the regions adjacent thereto are present, the server 100 may determine the maximum volume level of the TV 208 of the region of FIG. 13B to be level 30, the maximum volume level of the audio to be level 30, and the maximum operation level of the cleaner to be level 5.

That is, the server 100 may receive the information on the number of devices of each region and if it is determined that the users in the adjacent regions are present, the device set-up values may be differently set depending on the number of devices, thereby reducing the floor noise.

Figure 14:
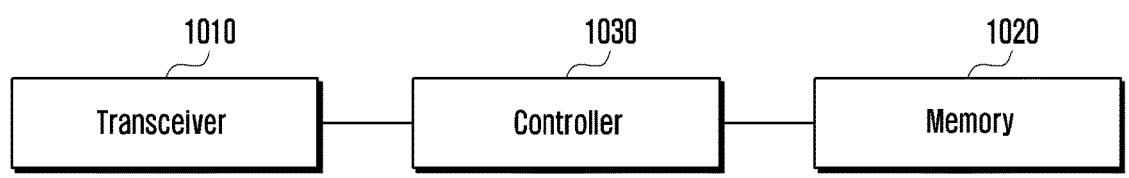
FIG. 14 is a block diagram illustrating an internal structure of a server according to an embodiment of the present disclosure.

FIG. 14 is a block diagram illustrating an internal structure of a server 100 according to an embodiment of the present disclosure.

Referring to FIG. 14, the server 100 may include a transceiver 1010, a memory 1020, and a controller 1030.

The transceiver 1010 of the server 100 may be connected to the gateways 110 of each region to transmit and receive the required information. Further, the transceiver 1010 may be directly connected to the devices 200 of each region to transmit and receive the required information. Further, the transceiver 1010 may be directly connected to the sensors 120 of each region to transmit and receive the required information.

The transceiver 1010 of the server 100 may include, for example, at least one of a wireless local area network (LAN) module and an NFC module. The wireless LAN module may be connected to the internet or other devices at a location where a wireless access point (AP) (not illustrated) is installed according to a control of the controller 1030. The wireless LAN module may support a wireless LAN standard (Institute of Electrical and Electronics Engineers (IEEE) 802.11x) of IEEE. The NFC module may perform wireless NFC with other devices according to the control of the controller 1030. An NFC scheme may include Bluetooth™, infrared data association (IrDA), NFC, Wi-Fi, z-wave, Wi-Fi-direct, or ZigBee schemes, or the like.

The memory 1020 of the server 100 may store the device set-up value corresponding to the state of the user. For example, the memory 1020 of the server 100 may store the maximum volume level or the maximum operation level of the device 200 corresponding to the presence or absence of the user.

Further, the memory 1020 of the server 100 may store the maximum volume level or the maximum operation level of the device 200 corresponding to the characteristic information according to the characteristic information of each region. That is, the server 100 may store the device set-up values corresponding to the size of the region, the design structure of the region, and the number of devices located in the region, or the like.

The controller 1030 of the server 100 may determine the device set-up value of the device 200 of one region on the basis of the state of the user in the one region and the adjacent regions. Further, the transceiver 1010 may be controlled to transmit the device set-up value of the device 200 of the one region to the device 200 of the one region or the gateway 110 connected to the one region.

Figure 15:
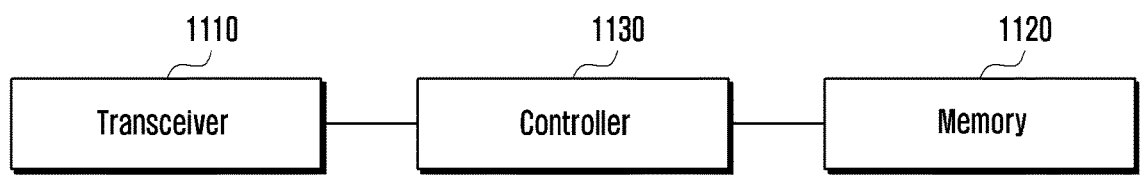
FIG. 15 is a block diagram illustrating an internal structure of a gateway according to an embodiment of the present disclosure.

FIG. 15 is a block diagram illustrating an internal structure of a gateway according to an embodiment of the present disclosure.

Referring to FIG. 15, the gateway 110 may include a transceiver 1110, a memory 1120, and a controller 1130.

For convenience of explanation, the present disclosure describes that the device (for example, TV) including the display serves as the gateway 110, but the devices that may serve as the gateway 110 are not limited thereto. For example, TV, a set-top box, personal computer (PC), a tablet, a hand phone, a robot cleaner, a refrigerator, a temperature controller, or the like may also serve as the gateway 110.

The transceiver 1110 of the gateway 110 may be connected to the server 100 to transmit and receive the required information. Further, the transceiver 1110 may be connected to the devices 200 of the region in which the gateway 110 is located to transmit and receive the required information. Further, the transceiver 1110 may be connected to the sensor 120 of the region in which the gateway 110 is located to transmit and receive the required information.

The transceiver 1110 of the gateway 110 may include, for example, at least one of a wireless LAN module and an NFC module. The wireless LAN module may be connected to the Internet or other devices at a location where a wireless AP (not illustrated) is installed according to a control of the controller 1130. The wireless LAN module may support a wireless LAN standard (IEEE 802.11x) of TEED. The NFC module may perform wireless NFC with other devices according to the control of the controller 1130. An NFC scheme may include Bluetooth™, IrDA, NFC, Wi-Fi, z-wave, Wi-Fi-direct, or ZigBee schemes, or the like.

The memory 1120 of the gateway 110 may temporarily or permanently store the information acquired from the server 100, the sensor 120, or the device 200 of one region.

The controller 1130 of the gateway 110 may control the transceiver 1110 to request the required information to the server 100. Further, the controller 1130 may receive the device set-up value of the device 200 of one region from the server 100 and control the transceiver 1110 to transfer the received device set-up value to the device 200 of the one region.

Figure 16:
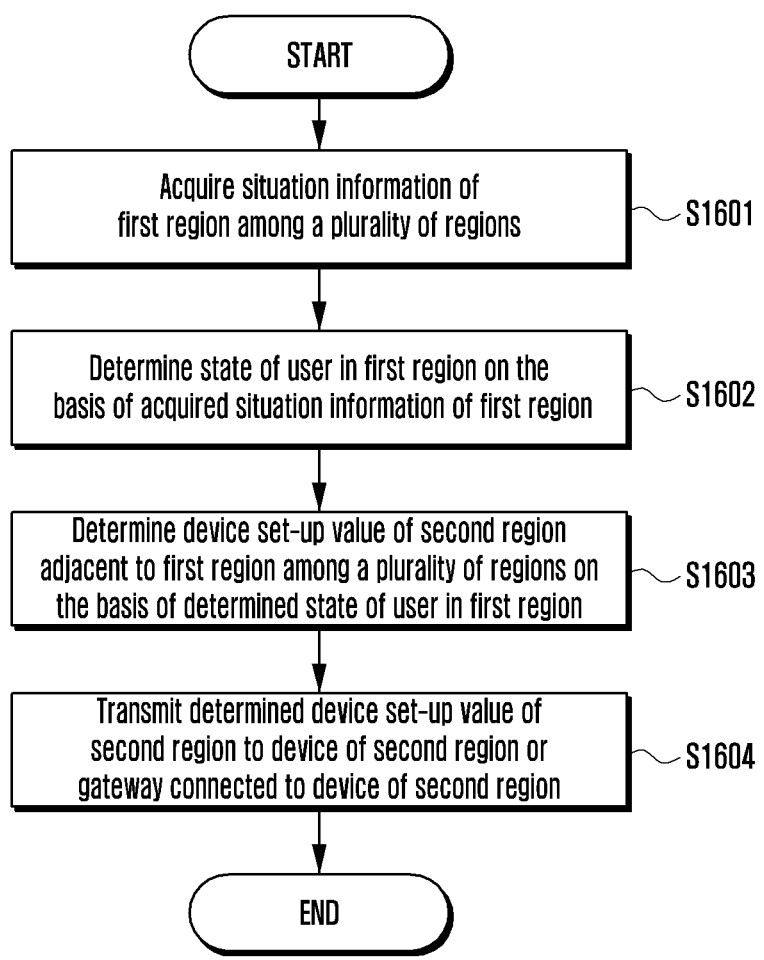
FIG. 16 is a diagram illustrating a process of controlling, by a server, a device of one region according to an embodiment of the present disclosure.

FIG. 16 is a diagram illustrating a process of controlling, by a server, a device of one region according to an embodiment of the present disclosure.

Referring to FIG. 16, in operation S1601 of FIG. 16, the server 100 may acquire the situation information of the first region among the plurality of regions. For example, the server 100 may acquire the situation information of the first region according to the request of the user in the second region adjacent to the first region among the plurality of regions or the request of the gateway of the second region. In this case, the situation information of the first region may be the information acquired from the sensor 120 located in the first region.

The server 100 acquiring the situation information of the first region 1 may determine the state of the user in the first region 1 on the basis of the situation information of the first region acquired in operation 1602. In operation S1603, the server 100 may determine the device set-up value of the device 200 of the second region adjacent to the first region among the plurality of regions on the basis of the determined state of the user in the first region.

For example, if it is determined that the user in the first region is present, the server 100 may determine the device set-up value of the device 200 of the second region corresponding to the state in which the user in the first region is present. Alternatively, if it is determined that the user in the first region is present, the server 100 may determine the device set-up value of the device 200 of the second region corresponding to the state in which the user in the first region is absent. The device set-up value may include the maximum volume level or the maximum operation level that the device 200 of the second region may output.

In operation S1604, the server 100 may transmit the determined device set-up value to the device 200 of the second region or the gateway 110 connected to the device 200 of the second region.

Therefore, the device 200 of the second region receiving the device set-up value controls the maximum volume level or the maximum operation level, thereby reducing the floor noise.

According to the various embodiments of the present disclosure, the noise generated in one region among the plurality of regions may be hardly transferred to other neighboring regions. As a result, the users in the neighboring regions may keep comfortable and the user in one region may control the device with an easy mind while considering people in the neighboring regions.

As a result, as the user satisfaction using the plurality of regions is increased and the use frequency of the plurality of regions is increased, the return of the operator operating the plurality of regions may be increased. For example, guest satisfaction using a hotel is increased, and as a result the return of the hotel operator may be increased.

The present disclosure relates to a technology for a sensor network, machine to machine (M2M), machine type communication (MTC), and internet of things (IoT). The present disclosure may be used for an intelligent service (smart home, smart building, smart city, smart car or connected car, health care, digital education, retail business, security and safety related service, or the like) based on the technology.

Further, the effects that may be obtained or expected by the various embodiments of the present disclosure shall be directly or implicitly disclosed in the detailed description of the present disclosure. That is, various effects that may be expected by the various embodiments of the present disclosure shall be disclosed in the detailed description to be described below.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of a server for controlling a device in a second region of a second user among a plurality of regions, the method comprising:
   acquiring situation information of a first region being adjacent to the second region among the plurality of regions, the situation information being determined based on information from sensors located in the first region;
   identifying a threshold of an output for devices in the second region based on the situation information of the first region;
   determining an operation value for the device, which is located in the second region, based on a noise level of the second region, the operation value being determined based on the noise level of the second region and the threshold; and
   transmitting the operation value to the device or a gateway connected to the device.

2. The method of claim 1, wherein the operation value is determined based on whether a first user is present or absent in the first region.

3. The method of claim 1, wherein the operation value is determined so that a sum of an output of the device corresponding to the operation value and the noise level does not exceed the threshold.

4. The method of claim 1, further comprising:
   determining a message associated with a state of a first user in the first region; and
   transmitting the message to the device in the second region or the gateway.

5. The method of claim 1, wherein the acquiring of the situation information includes acquiring the situation information according to a request of the second user or a request of the gateway.

6. The method of claim 1, further comprising:
   determining a state of a first user in the first region based on the situation information and characteristic information associated with a use behavior of the first region.

7. The method of claim 1, wherein the device is configured to output a sound or vibration.

8. The method of claim 1, wherein the sensors include at least one of a motion detection sensor, a door open and close detection sensor, a temperature sensor, or an illumination sensor.

9. The method of claim 1,
   wherein the operation value is determined based on property information of the first region, and
   wherein the property information includes at least one of a size of the first region or a type of the first region.

10. A server for controlling a device in a second region of a second user among a plurality of regions, the server comprising:
    a transceiver; and
    at least one processor configured to:
       acquire situation information of a first region being adjacent to the second region among the plurality of regions, the situation information being determined based on information from sensors located in the first region,
       identify a threshold of an output for devices in the second region based on the situation information of the first region,
       determine an operation value for the device, which is located in the second region, based on a noise level of the second region, the operation value being determined based on the noise level of the second region and the threshold, and
       transmit the operation value to the device or a gateway connected to the device.

11. The server of claim 10, wherein the operation value is determined based on whether a first user is present or absent in the first region.

12. The server of claim 10, wherein the operation value is determined so that a sum of an output of the device corresponding to the operation value and the noise level does not exceed the threshold.

13. The server of claim 10, wherein the at least one processor is further configured to:
    determine a message associated with a state of a first user in the first region, and
    transmit the message to the device in the second region or the gateway.

14. The server of claim 10, wherein the at least one processor is further configured to acquire the situation information according to a request of the second user or a request of the gateway.

15. The server of claim 10, wherein the at least one processor is further configured to determine a state of a first user in the first region based on the situation information and characteristic information associated with a use behavior of the first region.

16. The server of claim 10, wherein the device is configured to output a sound or vibration.

17. The server of claim 10, wherein the sensors include at least one of a motion detection sensor, a door open and close detection sensor, a temperature sensor, or an illumination sensor.

18. The server of claim 10,
    wherein the operation value is determined based on property information of the first region, and
    wherein the property information includes at least one of a size of the first region or a type of the first region.

* * * * *